(12) United States Patent
Weruaga

(10) Patent No.: US 10,880,440 B2
(45) Date of Patent: Dec. 29, 2020

(54) ECHO CANCELLER AND METHOD THEREFOR

(71) Applicant: PROACTIVAUDIO GMBH, Vienna (AT)

(72) Inventor: Luis Weruaga, Vienna (AT)

(73) Assignee: PROACTIV AUDIO GMBH, Vienna (AT)

( * ) Notice: Subject to any disclaimer, the term of this patent is extended or adjusted under 35 U.S.C. 154(b) by 0 days.

(21) Appl. No.: 16/646,352

(22) PCT Filed: Oct. 4, 2017

(86) PCT No.: PCT/AT2017/060247
§ 371 (c)(1),
(2) Date: Mar. 11, 2020

(87) PCT Pub. No.: WO2019/068115
PCT Pub. Date: Apr. 11, 2019

(65) Prior Publication Data
US 2020/0274972 A1    Aug. 27, 2020

(51) Int. Cl.
*G10L 25/06*    (2013.01)
*H04M 9/08*    (2006.01)

(52) U.S. Cl.
CPC .................. *H04M 9/082* (2013.01)

(58) Field of Classification Search
CPC ..... G10L 21/0232; G10L 25/06; H04M 9/082
(Continued)

(56) References Cited

U.S. PATENT DOCUMENTS

| 7,333,605 | B1 * | 2/2008 | Zhang | H04M 9/082 |
| | | | | 370/286 |
| 8,625,775 | B2 * | 1/2014 | Bhaskar | H04M 9/082 |
| | | | | 379/406.01 |

(Continued)

FOREIGN PATENT DOCUMENTS

EP    2930917 A1    10/2015

OTHER PUBLICATIONS

International Preliminary Report on Patentability for corresponding Int'l Appl. No. PCT/AT2017/060247, 1-6 pgs, dated Apr. 7, 2020.

(Continued)

*Primary Examiner* — Gerald Gauthier
(74) *Attorney, Agent, or Firm* — Hoffmann & Baron, LLP

(57) ABSTRACT

The invention relates to a computer-implemented method for updating at least one frequency-domain filter coefficient $W_{i,j}(k)$ of an echo canceller having at least one channel and at least one segment per channel, the filter coefficients of the echo canceller being updateable in the frequency domain at a time block m comprising:

determining a canceller output $E_m(k)$ over the mth time block;

determining a canceller error $\varepsilon(k)$ over the m−$\ell$ th time block;

determining a look-backward error $\overleftarrow{\varepsilon}(k)$;

determining a look-forward error $\overrightarrow{\varepsilon}(k)$ as $$\overrightarrow{\varepsilon}(k) = E_m(k) - \lambda \overrightarrow{\Delta}(k)$$

wherein $\overrightarrow{\Delta}(k)$ is based on (Continued)

$$\sum_{i=0}^{C-1} \sum_{j=0}^{S-1} \frac{\mathcal{E}(k) X_{i,j,m-\ell}^*(k)}{\sum_{a=0}^{C-1} \sum_{b=0}^{S-1} |X_{a,b,m-\ell}(k)|^2 + \epsilon} X_{i,j,m}(k);$$

determining an optimal update step-size $\mu_{i,j,m}(k)$ from said canceller output $E_m(k)$ over the mth time block, from said canceller error $\varepsilon(k)$ over the m–$\ell$th time block, from said look-backward error $\overleftarrow{\varepsilon}(k)$, and from said look-forward error $\overrightarrow{\varepsilon}(k)$; and updating said at least one filter coefficient $W_{i,j}(k)$ by using said optimal update step-size $\mu_{i,j,m}(k)$. The invention further pertains to an echo canceller implementing said method.

20 Claims, 5 Drawing Sheets

(58) Field of Classification Search
USPC ............ 379/406.01, 406.06, 406.08, 406.13;
381/66; 455/570; 704/205
See application file for complete search history.

(56) References Cited

U.S. PATENT DOCUMENTS

| | | | |
|---|---|---|---|
| 8,983,057 B1* | 3/2015 | Deng | H04M 9/082 379/406.06 |
| 9,036,816 B1* | 5/2015 | Ayrapetian | H04M 9/082 379/406.13 |
| 9,972,337 B2* | 5/2018 | Li | G10L 21/0232 |
| 2006/0018460 A1 | 1/2006 | McCree | |
| 2008/0260172 A1* | 10/2008 | Sakuraba | H04M 9/082 381/66 |
| 2010/0195815 A1* | 8/2010 | Tada | H04M 9/082 379/406.01 |
| 2011/0058667 A1* | 3/2011 | Takada | H04M 9/082 379/406.08 |
| 2012/0136654 A1* | 5/2012 | Lou | H04M 9/082 704/205 |
| 2014/0112488 A1* | 4/2014 | Kim | H04M 9/082 381/66 |
| 2014/0146963 A1* | 5/2014 | Ikram | H04M 9/082 379/406.08 |
| 2014/0329568 A1* | 11/2014 | Xue | G10K 11/16 455/570 |
| 2016/0050491 A1* | 2/2016 | Ahgren | H04R 3/002 381/66 |
| 2019/0074025 A1* | 3/2019 | Lashkari | G10L 21/0232 |
| 2020/0274972 A1* | 8/2020 | Weruaga | H04M 9/082 |

OTHER PUBLICATIONS

International Search Report with Written Opinion dated May 23, 2018

* cited by examiner

ECHO CANCELLER AND METHOD THEREFOR

CROSS-REFERENCE TO RELATED APPLICATIONS

This application is a National Phase application of International Application No. PCT/AT2017/060247 filed Oct. 4, 2017, the disclosure of which is incorporated herein by reference.

TECHNICAL FIELD

The present invention relates to a computer-implemented method for updating at least one frequency-domain filter coefficient of an echo canceller having at least one channel and at least one segment per channel, the filter coefficients of the echo canceller being updatable in the frequency-domain at a time block. The invention further relates to an echo canceller configured to execute said method.

BACKGROUND

Acoustic echo is a major impairment present in audio communications, such as in videoconferencing, in-car voice communications, voice interfaces, and human-machine dialogue systems. Multi-channel acoustic echo (see "Acoustic multi-channel echo cancellation," EP 2438766 B1 and "Advances in digital speech transmission," Wiley. 2008) manifests when the sound from a plurality of loudspeakers connected to a terminal are captured by the microphone connected to said terminal. The terminal can refer to a desktop computer, or mobile phone, tablet, voice-commanded assistant, dedicated audioconferencing equipment, hand-free car telephony, et cetera.

As said terminal is usually placed within a room, the multiple sound reflections at the room walls arrive at the microphone at different time instants and intensities, hence creating a large number of acoustic echoes. The characteristics of said echo "fingerprint" is sensitive to the location of the microphone and loudspeaker(s), the room geometry and the objects and persons present therein.

The echo has a negative impact in the communication because participants in a videoconference hear their voices echoed as they speak, speech interfaces get "drowned" by the sounds (such as music) played by their loudspeaker system, and persosn engaged in a mobile phone call to a car driver hear their own voices echoed inside the car chamber.

While mono systems still represent a good number of said terminals, multi-channel audio systems are increasingly appearing: car sound systems are at least stereo, dedicated videoconferencing equipment may use several loudspeakers for different participants, thus creating a more realistic meeting experience, and embedded voice interfaces are commonly integrated within stereo-sound equipment.

The present invention focuses on the problem scenario illustrated in FIG. 1, wherein a plurality of audio sources 10, e. g. audio channels, are played by a plurality of loudspeakers 20 in a room, and all the sounds in the room are captured by only one microphone 30. Its extension to more than one microphone (for instance to transmit stereo sound) is deemed straightforward, as the present invention can be applied on every microphone signal separately. Henceforth, "effective" loudspeaker refers to all electroacoustic device(s) that reproduce the same audio source or a linearly filtered version thereof. For instance if an stereo sound-reproduction system plays a single-channel (mono) audio source, the number of effective loudspeakers is one. Another example is a car stereo system, which may count several (more than two) physical loudspeakers, but if the car sound system is for instance reproducing stereo music, the number of effective loudspeakers, e. g. audio channels, is two.

The signal z(n) captured by the microphone 30 upon undergoing an analogue to digital conversion can be expressed as follows $$z(n) = d(n) + v(n) + p(n) + \sum_{i=0}^{C-1} \sum_{l=0}^{L_H-1} h_i(l) s_i(n-l), \quad (1)$$

wherein n is discrete time, C is the number of far-end audio channels, $s_i(n)$ is the far-end audio source at the ith-channel, $h_i(l)$ is the equivalent discrete-time echo path between the ith effective loudspeaker and the microphone, $L_H$ is the total length in samples of the echo path, d(n) is the main (or desired) near-end sound signal, and v(n) is the near-end background noise. The last term p(n) refers to the deviations from the linear echo model in (1), such as due to non-linear characteristics of the loud-speaker(s). The main near-end signal d) may result from several sources within the room. Usually d(n) is speech, music, or both, et cetera, of semantic value to the far-end listener, hence it is to be transmitted with minimum distortion. On the other hand, the near-end background noise v(n), assumed to be nearly stationary, carries relevant contextual information of the near-end acoustic scene.

The Objective of any acoustic echo reduction system is threefold:
1. to reduce the echo components in the microphone signal z(n) to the extent that they become inaudible,
2. to preserve the quality of the main near-end signal d(n) present in the microphone signal z(n) as much as possible, and
3. to maintain the perceptual impression of the near-end background noise v(n) present in the microphone signal z(n).

An acoustic echo canceller (AEC), a residual-echo nonlinear processor (NIP), and a comfort-noise injector (CNI), all governed by an echo control apparatus, are meant to execute respectively said threefold objective.

In the following, a short overview of the technological background of the echo reduction system is given with reference to FIGS. 1 and 2.

A basic multi-channel and multi-segment acoustic echo canceller 200 comprises a plurality of digital linear transversal filters 210, such that the response related to the ith channel is built as $$u_i(n) = \sum_{j=0}^{S-1} \sum_{l=0}^{L-1} w_{i,j}(l) x_{i,j}(n-l), \quad (2)$$

wherein S is the number of segments per channel, L is the filter length in each segment, $w_{i,j}(l)$ corresponds to the filter coefficients of the ith channel and jth segment, and $x_{i,j}(n)$ is the input signal to filter $w_{i,j}(l)$ defined as $$x_{i,j}(n) = s_i(n-jL). \quad (3)$$

The concatenation of the filters from all S segments in the ith channel builds the impulse response of the echo canceller for said ith channel.

The synthetic echo model (2) is meant to deliver a signal that resembles the echoes in z(n) related to the ith channel. The global canceller output is built in 220 additively with the contributions from all C channels as follows $$e(n) = z(n) - \sum_{i=0}^{C-1} u_i(n), \quad (4)$$

resulting in an output e(n) of reduced echo content.

A criterion to select the filter length L is namely to enclose large quasi-stationary intervals of the far-end signals $s_i(n)$. For instance, most speech phonemes are found within few tens of milliseconds, but, in longer ranges, speech usually contains at least two phonemes of different spectral characteristics. A stereo speech-based echo control for automotive spaces with echo path lengths in the order of 40-milliseconds could be designed as follows: the echo canceller would have two channels, e. g. C=2, and at least two segments per channel, e. g. S≥2, with a filter length L equivalent to 20-milliseconds worth of signal samples, hence with four transversal filters, C×S=2×2=4. Having different lengths for each filter could be possible too.

Because L is usually a large number, the time-domain convolution (2) turns out a costly operation. As alternative thereto, the response of the canceller can be efficiently computed in the frequency domain with N-point blocks, such that N is chosen as a power of two for better computational efficiency. Said frequency-domain block-based convolution is obtained as follows $$u = F^{-1} \sum_{i=0}^{C-1} \sum_{j=0}^{S-1} W_{i,j} \circ X_{i,j}, \quad (5)$$

wherein F is the N-point discrete Fourier transform (INT) matrix ($F^{-1}$ corresponds thus to the inverse discrete Fourier transform), and the operation ∘ denotes element-by-element multiplication. The N-point column vectors $W_{i,j}$ and $X_{i,j}$, which refer respectively to the frequency-domain weights and far-end input block of the ith channel and jth segment, are built as follows $$W_{i,j} = F \begin{bmatrix} w_{i,j}(0) & \cdots & w_{i,j}(L-1) & 0 & \overset{\leftarrow N-L \rightarrow}{\cdots} & 0 \end{bmatrix}^T \quad (6)$$

$$X_{i,j} = F[x_{i,j}(n-N+1) \cdots x_{i,j}(n-1) \; x_{i,j}(n)]^T, \quad (7)$$

wherein T denotes transpose.

The operation (5) delivers exactly M=N−L+1 valid samples of the linear convolution, said samples being located in the last M rightmost elements of vector u. The M valid errors, obtained with the difference between the microphone signal and the overall canceller response as per (4), are stored in vector e for further processing $$e = [e(n-M+1) \ldots e(n)]^T. \quad (8)$$

In order to obtain a canceller response (5) closer to the actual echo in the microphone signal z(n), the frequency-domain weights $W_{i,j}$ of the ith channel and ith segment are updated via the fast LMS algorithm (see "Acoustic echo devices and methods," US 2006/0018460 A1) as follows $$W_{i,j}^{new} = W_{i,j} - \mu E \circ X_{i,j}^* \Big/ \left( \sum_{i=0}^{C-1} \sum_{j=0}^{S-1} |X_{i,j}|^2 + \epsilon \right), \quad (9)$$

wherein $W_{i,j}^{new}$ contains the updated weights, E is the frequency-domain counterpart of the canceller output e, obtained as follows $$E = F \begin{bmatrix} 0 & \overset{\leftarrow N-M \rightarrow}{\cdots} & 0 & e^T \end{bmatrix}^T, \quad (10)$$

the operator * denotes complex conjugate, the vector operator/represents element-by-element division, $|X_{i,j}|^2$ is a vector built with the square magnitude of every complex-valued element in vector $X_{i,j}$, $\epsilon$>0 prevents division by zero or values near zero, and μ is the step size.

Because the time-domain counterpart of the new weight vector $W_{i,j}^{new}$ should contain zeroes in its rightmost side (6), the new spectral weights (9) can be further updated by returning said weights to the time domain, resetting (to zero) the last N−L taps, and returning the result back to the frequency domain. Said time-constraint operation demands two additional DFT operations, hence increasing the computation complexity. If desired, this step can be avoided at the price of slower convergence (see "Unconstrained frequency-domain adaptive filter," IEEE Transaction on Acoustics, Speech ad Signal Processing, October, 1982). As this operation is well known by any expert in the art, we use (9) as the generic representation of the weight update rule, which encompasses the option to perform (or not) said time-constraint operation.

It is known that the convergence of said adaptive system (9) is assured for a step size in the range 0<μ<2. However, the range 0<μ≤1 is considered in the practice, whose limits correspond to frozen update μ=0 and fastest update μ=1 in interference-free conditions.

The generic multi-channel and multi-segment adaptive system (9) has been matter of thorough study (see "Generalized multichannel frequency-domain adaptive filtering: efficient realization and application to hands-free speech communication," Signal Processing 85, pp. 549-570, 2005, "Acoustic echo devices and methods," US 2006/0018460 A1, "Acoustic multi-channel echo cancellation," EP 2438766 B1, "Method and apparatus for multi-channel audio processing using single-channel components," U.S. Pat. No. 8,233,632 B1, and "Subband echo cancellation method for multi-channel audio teleconference and echo canceller using the same," U.S. Pat. No. 6,246,760 B1).

In order for the prior state of art to succeed in real scenarios, several challenges are yet to be effectively solved:

The presence of non-cancellable terms, such as d(n) and v(n), in error E corrupts the update (9), which as result exhibits unstable behaviour. Double-talk detectors (DTT) aim to prevent this drawback by detecting when it is safe to train the adaptive system (see "Enhanced echo cancellation," U.S. Pat. No. 8,873,740 B2). So far, DTTs have not proven accurate nor quick enough, especially under severe double-talk. Hence, robustness against any type of double-talk is yet to be effectively solved.

As the global error E is used for the update (9) of every filter, the misalignment of any filter is propagated to the remaining C×S−1 filters, and vice versa. Despite being considered intrinsic in adaptive filtering, this fact harms the canceller's learning abilities. For instance, in web-based audioconferencing, user motion or change of the terminal orientation has larger impact on early echoes. It is thus desirable to count with a mechanism of true filter-independent update.

Upon the previous two drawbacks, attempting to adapt the filters with the canceller output E according to the state of art results in unstable and slow convergence, hence failing to reduce the echo quick enough to acceptable levels.

Upon the echo cancellation, the canceller output E may still contain audible echo because:

the echo path length $L_H$ is larger than the canceller length, $L_H \gg S \times L$, hence the late-arriving echoes cannot be cancelled, the adaptive canceller is yet to converge to the "steady state", and non-linear echo components, characterized by p(n) in (1), cannot be removed by the linear echo canceller (5).

The canceller output can be thus rewritten in the following additive model $$E = D + V + P + Q + \sum_{i=0}^{C-1}\sum_{j=0}^{S-1} R_{i,j}, \qquad (11)$$

wherein D corresponds to the main near-end signal, V is the near-end background noise, P corresponds to the non-linear echo components, Q represents the echo beyond the time scope of the canceller, and $R_{i,j}$ is the residual echo related to the ith channel and jth segment.

In order to reduce effectively the residual echo P, Q, and $R_{i,j}$ to inaudible levels, a non-linear processing 300 (NLP) stage is to act over the canceller output E, delivering the echo-free output O. Several strategies are possible thereto, such as filtering, spectral subtraction, or by following principles of psychoacoustics, this last one being the option when dealing with music signals. Let us consider for the purpose of illustration a filtering-based approach $$O = E \circ B_{NLP}, \qquad (12)$$

wherein $0 \le B_{NLP} \le 1$ is the frequency-response of the NLP filter.

It is important to remark that the non-linear processing 300 (12), unlike echo cancellation 200, introduces distortion to the main near-end signal D present in the canceller output E, which creates a delicate tradeoff between so residual echo reduction versus main near-end signal distortion. The stage of echo cancellation plays a decisive role in said tradeoff: if the echo canceller is notably misaligned, the NLP filtering must act aggressively over the residual echo at the risk of damaging the main near-end signal; con-versely, if the canceller manages to remove efficiently most of the echo, the impact of the NLP filter over the main near-end signal may go unnoticed. Therefore, the accurate estimation of all residual echo terms, P, Q, and $R_{i,j}$ present in the canceller output E is important for an effective NLP stage.

Residual echo suppression is concern of recent prior art, such as in "Acoustic echo suppression," US 2017/0118326 A1, wherein the activation of the echo suppressor depends on one or more transient or steady-state parameters. In another recent invention, "Robust acoustic echo cancellation for loosely paired devices based on semi-blind multichannel demixing," US 2016/0029120 A1, a semi-blind multichannel source separation is performed to decompose the audio signals into a near-end source signal and residual echoes based on independent component analysis, thus requiring more than one (multiple) microphones to operate.

The near-end background noise V is distorted by the NLP operation (12) as well. This fact causes periods of silence and/or sudden changes in the background noise level, which can be distracting, if not annoying, for the listener. Comfort noise injection 400 (see "Comfort noise generator for echo cancelers" U.S. Pat. No. 5,949,888 A1) solves this drawback by filling up the gaps with synthetic noise, hence giving the illusion of a uniform background noise. The injected synthetic noise must resemble the actual near-end background noise v(n) in both spectral content and level. The final output Y of the echo reduction system can be obtained as follows $$i\ Y = O + \hat{V} \circ (1 - B_{NLP}), \qquad (13)$$

wherein $\hat{V}$ is the synthetic replica of the near-end background noise. Accurate spectral estimation of the near-end background noise V turns out important to maintain a pleasant listening experience.

In the prior art "Method and apparatus pr comfort noise generation in speech communication systems" U.S. Pat. No. 7,610,197 B2, the background noise is obtained by accumulating and smoothing over time the spectral samples E; in the inventions "Comfort noise veneration method and system," US 2011/0228946 A1, "Enhanced echo cancellation," U.S. Pat. No. 8,873,740 B2, the estimation of the background noise is carried out during periods when both far-end and near-end are inactive. The state of the art may not always work: in case of audioconferencing in moderately reverberated rooms, the residual echo beyond the canceller scope Q may fill up periods of silence in the near-end signal, thus acting de-facto as background noise; this problem is further stressed with gapless audio content such as music, in which the residual echo can be mistaken as noise in the background.

BRIEF SUMMARY

In view of the problems discussed above, is an object of the invention to provide an improved acoustic echo canceller that is more stable and yields a faster convergence.

The problems are solved in a first aspect of the invention by a computer-implemented method for updating at least one frequency-domain filter coefficient $W_{i,j}(k)$ of an echo canceller having at least one channel and at least one segment per channel, the filter coefficients of the echo canceller being updateable in the frequency domain at a time block m comprising:

determining a canceller output $E_m(k)$ over the mth time block as the difference between $Z_m(k)$ and a cancelling term based on $$\sum_{i=0}^{C-1}\sum_{j=0}^{S-1} W_{i,j}(k) X_{i,j,m}(k); \qquad (14)$$

determining a canceller error $\varepsilon(k)$ over the m–$\ell$ th time block as the difference between $Z_{m-\ell}(k)$ and a cancelling term based on $$\sum_{i=0}^{C-1}\sum_{j=0}^{S-1} W_{i,j}(k) X_{i,j,m-\ell}(k); \qquad (15)$$

determining a look-backward error $\overleftarrow{\varepsilon}(k)$ as $$\overleftarrow{\varepsilon}(k) = \varepsilon(k) - \lambda \overleftarrow{\Delta}(k), \qquad (16)$$

wherein $\overleftarrow{\Delta}(k)$ is based on $$\sum_{i=0}^{C-1}\sum_{j=0}^{S-1}\frac{E_m(k)X_{i,j,m}^*(k)}{\sum_{a=0}^{C-1}\sum_{b=0}^{S-1}|X_{a,b,m}(k)|^2+\epsilon}X_{i,j,m-\ell}(k); \quad (17)$$

determining a look-forward error $\vec{\varepsilon}(k)$ as $$\vec{\varepsilon}(k)=E_m(k)-\lambda\vec{\Delta}(k), \quad (18)$$

wherein $\vec{\Delta}(k)$ is based on $$\sum_{i=0}^{C-1}\sum_{j=0}^{S-1}\frac{\mathcal{E}(k)X_{i,j,m-\ell}^*(k)}{\sum_{a=0}^{C-1}\sum_{b=0}^{S-1}|X_{i,j,m-\ell}(k)|^2+\epsilon}X_{i,j,m-\ell}(k); \quad (19)$$

determining an optimal update step size $\mu_{i,j,m}(k)$ from said canceller output $E_m(k)$ over the mth time block, from said canceller error $\varepsilon(k)$ over the m-$\ell$ th time block, from said look-backward error $\overleftarrow{\varepsilon}(k)$, and from said look-forward error $\vec{\varepsilon}(k)$; and updating said at least one filter coefficient $W_{i,j}(k)$ by using said optimal update step-size $\mu_{i,j,m}(k)$;

wherein

C corresponds to the number of channels i=0, . . . , C−1 of the echo canceller,

S corresponds to the number of segments j=0, . . . , S−1 per channel of the echo canceller, $\ell$ is an integer different than zero, k denotes a frequency bin index, $\epsilon$ is a positive value, $Z_m(k)$ corresponds to the kth spectral bin of the microphone signal at the mth time block, $Z_{m-\ell}(k)$ corresponds to the kth spectral bin of the microphone signal at the m-$\ell$ th time block, $X_{i,j,m}(k)$ corresponds to the kth spectral bin of the far-end signal at the ith channel, jth segment, and mth time block, $X_{i,j,m-\ell}(k)$ corresponds to the kth spectral bin of the far-end signal at the ith channel, jth segment, and m-$\ell$ th time block, $\lambda$ is the overshoot factor, and a, b are channel and segment indices, respectively.

The claimed method yields an optimal step size $\mu_{i,j,m}(k)$ that is very accurate thanks to using the information from the canceller output $E_m(k)$ at the mth block, the canceller error $\varepsilon(k)$ at the m-$\ell$ th block, and the look-forward error $\vec{\varepsilon}(k)$ in addition to the look-backward error $\overleftarrow{\varepsilon}(k)$. Because the integer $\ell$ can take a positive value, the m-$\ell$ th block is already available, hence not incurring any delay in the update, that is, the optimal step size $\mu_{i,j,m}(k)$ can be immediately obtained as soon as the mth time block is available. Said filter update with the optimal step size $\mu_{i,j,m}(k)$ as computed with the inventive method yields a faster convergence and a more effective reduction of echo than echo cancellers of the state of the art.

The wording "based on", adopted when introducing $E_m(k)$ and $\varepsilon(k)$ with (14) and (15), respectively, refers to additional standard signal processing, not explicitly included therein for the sake of simplicity in the notation as well as for being known to anyone skilled with the art, namely, discarding the invalid samples that result from the circular convolution inherent to the product of two frequency-domain sequences, such as in said (14) and (15). These arguments can be extended to the definition of $\overleftarrow{\Delta}(k)$ and $\vec{\Delta}(k)$ "based on" (17) and (19), respectively, as well as to terms computed in preferred embodiments.

Optionally, the optimal step-size $\mu_{i,j,m}(k)$ is computed by either $$\mu_{i,j,m}(k)=\frac{\Phi_{i,j}(k)\chi_{i,j,m}(k)}{\Psi_m(k)+\sum_{a=0}^{C-1}\sum_{b=0}^{S-1}\Phi_{a,b}(k)\chi_{a,b,m}(k)} \quad (20)$$

or $$\mu_{i,j,m}(k)=1-\sqrt{1-\frac{\Phi_{i,j}(k)\chi_{i,j,m}(k)}{\Psi_m(k)+\sum_{a=0}^{C-1}\sum_{b=0}^{S-1}\Phi_{a,b}(k)\chi_{a,b,m}(k)}}, \quad (21)$$

wherein $\Psi_m(k)$ is a power spectrum of the non-cancellable components at the mth time block and $\Phi_{i,j}(k)$ is a power spectrum of the misalignment of each i,jth filter, wherein $\Psi_m(k)$ and $\Phi_{i,j}(k)$ are determined by solving the set of linear equations $$\Psi_m(k)+\sum_{i=0}^{C-1}\sum_{j=0}^{S-1}\chi_{i,j,m}(k)\Phi_{i,j}(k)=|E_m(k)|^2 \quad (22)$$

$$Y(k)+\sum_{i=0}^{C-1}\sum_{j=0}^{S-1}\chi_{i,j,m-\ell}(k)\Phi_{i,j}(k)=|\mathcal{E}(k)|^2 \quad (23)$$

$$Y(k)+4\overleftarrow{T}(k)\Psi_m(k)+\sum_{i=0}^{C-1}\sum_{j=0}^{S-1}\chi_{i,j,m-\ell}(k)\Phi_{i,j}(k)=|\overleftarrow{\mathcal{E}}(k)|^2 \quad (24)$$

$$4\vec{T}(k)Y(k)+\Psi_m(k)+\sum_{i=0}^{C-1}\sum_{j=0}^{S-1}\chi_{i,j,m}(k)\Phi_{i,j}(k)=|\vec{\mathcal{E}}(k)|^2 \quad (25)$$

subject to inequality constraints $$Y(k)>0, \Psi_m(k)>0, \Phi_{0,0}(k)>0, \ldots, \Phi_{C-1,S-1}(k)>0; \quad (26)$$

wherein $X_{i,j,m}(k)$ corresponds to the kth power spectral bin of the far-end signal at the ith channel, jth segment, and mth time block, wherein said signal block is optionally preferably windowed, $X_{i,j,m-\ell}(k)$ corresponds to the kth power spectral bin of the far-end signal at the ith channel, jth segment, and m-$\ell$ th time block, wherein said signal block is optionally windowed, Y(k) corresponds to a power spectrum of the non-cancellable components at the m-$\ell$ th block, $\overleftarrow{T}(k)$ is the normalized look-backward update, computed as $$\overleftarrow{T}(k)=\overleftarrow{\Delta}(k)/|E_m(k)|^2, \quad (27)$$

and $\vec{T}(k)$ is the normalized look-forward update, computed as $$\vec{T}(k)=\vec{\Delta}(k)/|\varepsilon(k)|^2. \quad (28)$$

The set of linear equations with inequality constraints is one of the main foundations of the inventive method. Because the unknowns Y(k) and $\Psi_m(k)$ appear in said set of linear equations in a balanced way, the condition of the problem is excellent. Removing one of the four equations would make one of those unknowns less visible, thus deteriorating significantly the condition of the whole problem (as the overall condition is bound by the worst of its parts). Because the number of equations is equal to four, the inventive method is particularly suited to stereo systems C=2 with one segment per channel S=1, as this case leads to four unknowns.

Moreover, the inventive method is especially useful for general multi-channel setups, e. g. C>1, that are under frequent near-end activity since the power spectrum of the non-cancellable components $\Psi_m(k)$ is obtained with high accuracy, and for the first time optimal continuous adaptation can be achieved regardless of the presence of near-end components, while in the state of the art a double-talk detector needs to assess whether there is a near-end signal to temporarily stop the update of all filter coefficients.

The first formula (20) for the optimal step size is simpler than the second one (21), as the latter involves the root square operation; however, formula (21) delivers better results. Therefore, if the second formula is chosen, its Taylor approximation can be used, delivering similar performance at much lower computational complexity.

Another problem that can arise is when at least the number of channels or the number of segments per channel is larger than one, e. g. when the canceller is composed of several transversal filters: as the global error $E_m(k)$ is used for the update of every filter, the misalignment of a given filter is propagated to the remaining filters upon the update, and vice versa, and thus slowing down the convergence of the entire adaptive system. To overcome this undesired drawback, one at a time any chosen r,sth filter can be considered not to be part of the canceller, e. g. its residual echo to be treated as non-cancellable component, and an additional look-backward error $\overleftarrow{\varepsilon_{r,s}}(k)$ and an additional look-forward error $\overrightarrow{\varepsilon_{r,s}}(k)$ involving the update off-line of all filters except the r,sth one are computed.

In order to employ the latter strategy, the invention provides a computer-implemented method for updating at least one frequency-domain filter coefficient $W_{i,j}(k)$ of the echo canceller, wherein at least one of the number of channels or the number of segments per channel is larger than one; and the optimal step size $\mu_{i,j,m}$ is determined from said canceller output $E_m(k)$ over the mth time block, from said canceller error $\varepsilon(k)$ over the m–$\ell$th time block, from said look-backward error $\overleftarrow{\varepsilon}(k)$, from said look-forward error $\overrightarrow{\varepsilon}(k)$ as well as from at least one additional look-backward error $\overleftarrow{\varepsilon_{r,s}}(k)$ and from at least one additional look-forward error $\overrightarrow{\varepsilon_{r,s}}(k)$ for at least one r,sth filter, r and s being indices of the channel and the segment, respectively wherein $$\overleftarrow{\varepsilon_{r,s}}(k)=\varepsilon(k)-\lambda\overleftarrow{\Delta_{r,s}}(k), \quad (29)$$

wherein $\overleftarrow{\varepsilon_{r,s}}(k)$ is based on $$\sum_i \sum_j^{i \neq r \& j \neq s} \frac{E_m(k)X^*_{i,j,m}(k)}{\sum_a \sum_b^{a \neq r \& b \neq s} |X_{a,b,m}(k)|^2 + \epsilon} X_{i,j,m-\ell}(k), \quad (30)$$

and $$\overrightarrow{\varepsilon_{r,s}}(k) = E_m(k) - \lambda\overrightarrow{\Delta_{r,s}}(k), \quad (31)$$

wherein $\overrightarrow{\Delta_{r,s}}(k)$ is based on $$\sum_i \sum_j^{i \neq r \& j \neq s} \frac{\mathcal{E}(k)X^*_{i,j,m-\ell}(k)}{\sum_a \sum_b^{a \neq r \& b \neq s} |X_{a,b,m-\ell}(k)|^2 + \epsilon} X_{i,j,m}(k). \quad (32)$$

Including the information from the additional look-backward $\overleftarrow{\varepsilon_{r,s}}(k)$ and look-forward $\overrightarrow{\varepsilon_{r,s}}(k)$ errors allows the inventive method to explicitly acomplish a more accurate estimation of the optimal step size(s) $\mu_{r,s,m}(k)$, as well as implicitly improving the optimal step size for other i,jth filters, which translates in faster convergence.

In this embodiment, the optimal step-size $\mu_{i,j,m}(k)$ is optionally computed as per either (20) or (21), wherein the power spectrum $\Phi_{i,j}(k)$ of the misalignment of each i,jth filter are detrmined by solving said set of linear equations (22), (23), (24), (25), with additional linear equations for the at least one r,sth filter $$Y(k) + 4\overleftarrow{T_{r,s}}(k)\Psi_m(k) + \quad (33)$$
$$4\overleftarrow{T_{r,s}}(k)X_{r,s,m}(k)\Phi_{r,s}(k) + + \sum_{i=0}^{C-1}\sum_{j=0}^{S-1} X_{i,k,m-1}(k)\Phi_{i,j}(k) = |\overleftarrow{\varepsilon_{r,s}}(k)|^2$$

$$\Psi_m(k) + 4\overrightarrow{T_{r,s}}(k)Y(k) + \quad (34)$$
$$4\overrightarrow{T_{r,s}}(k)X_{r,s,m-1}(k)\Phi_{r,s}(k) + + \sum_{i=0}^{C-1}\sum_{j=0}^{S-1} X_{i,k,m-1}(k)\Phi_{i,j}(k) = |\overrightarrow{\varepsilon_{r,s}}(k)|^2$$

subject to inequality constraints $$Y(k)>0, \Psi_m(k)>0, \Phi_{0,0}(k)>0, \ldots, \Phi_{C-1,S-1}(k)>0; \quad (35)$$

wherein
$\overleftarrow{T_{r,s}}(k)$ is the normalized look-backward update excluding the r,sth filter, computed as $$\overleftarrow{T_{r,s}}(k)=\overleftarrow{\Delta_{r,s}}(k)/|E_m(k)|^{21}, \quad (36)$$

and
$\overrightarrow{T_{r,s}}(k)$ is the normalized look-forward update excluding the r,sth filter, computed as $$\overrightarrow{T_{r,s}}(k)=\overrightarrow{\Delta_{r,s}}(k)/|\varepsilon(k)|^2. \quad (37)$$

These embodiments are especially useful not only in scenarios with frequent near-end activity, as discussed previously, but also for multi-channel and multi-segment setups, e. g. C>1 or S>1, as the global learning convergence is substantially improved, in particular by improving explicitly the estimation of the filter misalignment $\Phi_{r,s}(k)$, hence the convergence for each r,sth filter(s) therewith, while in the state of art the global error is spread uniformly through all filters, which leads to slower convergence.

Until now, it was assumed that the overshoot factor $\lambda$ needed to be equal to 1 as this led to a good trade-off between misalignment reduction and amplification of the non-cancellable components. However, it has been analytically found that even better results can be achieved if the overshoot factor $\lambda$ is chosen to be greater than one, in the range $1<\lambda\leq2$, and particularly substantially when $\lambda=2$. At said value the filter misalignment terms in the look-backward $\overleftarrow{\varepsilon}(k)$ and look-forward $\overrightarrow{\varepsilon}(k)$ errors have the same expected level as in the errors $\varepsilon(k)$ and $E_m(k)$, but the non-cancellable components turn out exactly two times larger in amplitude hence more "visible;" this fact translates into an estimation gain boost of the non-cancellable components on more than 6 dB. Likewise, an overshoot factor equal to 2 makes in particular the r,sth filter misalignment appear exactly two times larger in magnitude in both look-backward $\overleftarrow{\varepsilon}_{r,s}(k)$ and look-forward $\overrightarrow{\varepsilon}_{r,s}(k)$ errors, hence more "visible," which translates into an estimation gain boost of said filter misalignment on more than 6 dB.

In a further embodiment of the invention, the method furthermore determines:

a power spectrum $\mathcal{R}_m(k)$ of the residual echo due to filter misalignmet at the mth block by means of $$\mathcal{R}_m(k) = \sum_{i=0}^{C-1}\sum_{j=0}^{S-1} \Phi_{i,j}(k) X_{i,j,m}(k), \quad (38)$$

and/or a power spectrum $\mathcal{Q}_m(k)$ of the echo beyond the canceller's time scope at the mth block by means of the accumulative method $$\mathcal{Q}_m(k) = \gamma \mathcal{Q}_{m-1}(k) + \gamma \sum_{i=0}^{C-1} |W_{i,S-1}(k)|^2 X_{i,S-1,m-1}(k), \quad (39)$$

wherein 0<γ<1, and/or a power spectrum $\mathcal{P}_m(k)$ of the non-linear echo components at the filth block by means of $$\mathcal{P}_m(k) \propto \sum_{i=0}^{C-1}\sum_{j=0}^{S-1} \mu_{i,j,m}(k) \Phi_{i,j}(k) X_{i,j,m}(k), \quad (40)$$

wherein ∝ (denotes proportional, and subsequently an improved canceller output $O_m(k)$ based on the canceller output $E_m(k)$ and on at least one of the determined power spectra of residual echo due to the filter misalignment $\mathcal{R}_m(k)$, the echo beyond the canceller's time scope $\mathcal{Q}_m(k)$, and the non-linear echo $\mathcal{P}_m(k)$.

The filter misalignment terms $\Phi_{i,j}(k)$ and the power spectra $X_{i,j,m}(k)$ employed to evaluate $\mathcal{R}_m(k)$ and $\mathcal{P}_m(k)$ correspond to the same terms used to evaluate the optimal step size(s) (20) and (21). In consequence, those terms are re-used, hence keeping the computational complexity low while profiting from the high estimation accuracy of said terms. On the other hand, the term $\mathcal{Q}_m(k)$ involves the filter $W_{i,S-1}(k)$, which is quickly updated at every block by the optimal mechanism of the inventive method.

One way to obtain said improved canceller output $O_m(k)$ with the canceller output $E_m(k)$ while including the above mentioned terms (38), (39), and (40) is to use a Wiener filter or any other type known in the state of the art. If the optional Wiener filter is to be implemented, the improved canceller output $O_m(k)$ is determined as $$O_m(k) = E_m(k) B_m(k) \quad (41)$$

$$B_m(k) = \left\lfloor \frac{|E_m(k)|^2 - \Lambda_m(k)}{|E_m(k)|^2} \right\rfloor_\varepsilon \quad (42)$$

$$\Lambda_m(k) = \mathcal{R}_m(k) + \mathcal{P}_m(k) + \mathcal{Q}_m(k) \quad (43)$$

wherein $\lfloor\ \rfloor_\varepsilon$ denotes low clipping by ε>0, $E_m(k)$ is the canceller output, $\mathcal{R}_m(k)$ is a power spectrum of the residual echo due to canceller filter misalignment at the mth block, $\mathcal{Q}_m(k)$ is a power spectrum of the echo beyond the canceller's time scope at the mth block, and $\mathcal{P}_m(k)$ is a power spectrum of the non-linear echo component(s) at the mth block.

The determination of the spectral power of the three residual echo terms (38), (39), and (40) are used for suppressing, e. g. filtering out (41), otherwise said residual echo components present in the canceller output $E_m(k)$. In some cases, it can be chosen to only compute one or two of the above-mentioned three terms because one or two terms might be significantly lower with respect to the other(s). In order to deliver a listening signal, the improved canceller output $O_m(k)$ is to be transformed to the time domain. Standard overlap-add processing, well known to anybody familiar with the art, can be used in order to avoid block-effects in the resulting time-domain output.

Optionally, the at least one filter coefficient $W_{i,j}(k)$ is updated based on $$W_{i,j}^{new}(k) = W_{i,j}(k) + \mu_{i,j,m}(k) \frac{E_m(k) X_{i,j,m}^*(k)}{|X_{i,j,m}(k)|^2 + \epsilon}. \quad (44)$$

Even though the inventive method governs a multi-channel/-segment echo canceller, the update (44) resembles a single-filter adaptive system, as the normalization term involves only the i,jth far-end power spectrum $|X_{i,j,m}(k)|^2$, in contrast with an standard multi-filter canceller, whose normalization term involves the accumulation of all far-end power spectra. This subtle detail, a real novelty in the art, implies ultimately that the i,jth input data $X^*_{i,j,m}(k)$ is effectively normalized, and that the main responsibility of the update lies on the optimal step size $\mu_{i,j,m}(k)$ determined by the inventive method.

In a second aspect, the invention provides for an echo canceller having at least one channel and at least one segment, the echo canceller having filter coefficients $W_{i,j}(k)$ being updateable in the frequency domain at a time block m, wherein the echo canceller is configured to:

determine a canceller output $E_m(k)$ over the filth time block as the difference between $Z_m(k)$ and a cancelling term based on $$\sum_{i=0}^{C-1}\sum_{j=0}^{S-1} W_{i,j}(k) X_{i,j,m}(k); \quad (45)$$

determine a canceller error ε(k) over the in m−$\ell$ th time block as the difference between $Z_{m-\ell}(k)$ and a cancelling term based on $$\sum_{i=0}^{C-1}\sum_{j=0}^{S-1} W_{i,j}(k) X_{i,j,m-\ell}(k); \quad (46)$$

determine a look-backward error $\overleftarrow{\varepsilon}$ (k) as $$\overleftarrow{\varepsilon}(k) = \varepsilon(k) - \lambda \overleftarrow{\Delta}(k) \quad (47)$$

wherein $\overleftarrow{\Delta}$ (k) is based on $$\sum_{i=0}^{C-1} \sum_{j=0}^{S-1} \frac{E_m(k) X^*_{i,j,m}(k)}{\sum_{a=0}^{C-1} \sum_{b=0}^{S-1} |X_{a,b,m}(k)|^2 + \epsilon} X_{i,j,m-\ell}(k); \quad (48)$$

determine a look-forward error $\overrightarrow{\varepsilon}$ (k) as $$\overrightarrow{\varepsilon}(k) = E_m(k) - \lambda \overrightarrow{\Delta}(k) \quad (49)$$

wherein $\overrightarrow{\Delta}$ (k) is based on $$\sum_{i=0}^{C-1} \sum_{j=0}^{S-1} \frac{\varepsilon(k) X^*_{i,j,m-\ell}(k)}{\sum_{a=0}^{C-1} \sum_{b=0}^{S-1} |X_{a,b,m-\ell}(k)|^2 + \epsilon} X_{i,j,m}(k); \quad (50)$$

determine an optimal update step-size $\mu_{i,j,m}(k)$ from said canceller output $E_m(k)$ over the mth time block, from said canceller error $\varepsilon(k)$ over the m–$\ell$ th time block, from said look-backward error $\overleftarrow{\varepsilon}$ (k), and from said look-forward error $\overrightarrow{\varepsilon}$ (k); and update said at least one filter coefficient $W_{i,j}(k)$ by using said optimal update step-size $\mu_{i,j,m}(k)$;

wherein

C corresponds to the number of channels i=0, . . . , C−1 of the echo canceller,

S corresponds to the number of segments j=0, . . . , S−1 per channel of the echo canceller, $\ell$ is an integer different than zero, k denotes a frequency bin, $\epsilon$ is a positive value, $Z_m(k)$ corresponds to the kth spectral bin of the microphone signal at the mth time block, $Z_{m-\ell}(k)$ corresponds to the kth spectral bin of the microphone signal at the m–$\ell$ th time block, $X_{i,j,m}(k)$ corresponds to the kth spectral bin of the far-end signal at the ith channel, jth segment, and mth time block, $X_{i,j,m-\ell}(k)$ corresponds to the kth spectral bin of the far-end signal at the ith channel, jth segment, and m–$\ell$ th time block, $\lambda$ is the overshoot factor, and a, b are channel and segment indices, respectively.

All advantages of the embodiments and variants of the method as described above also hold for the echo canceller.

BRIEF DESCRIPTION OF THE DRAWINGS

The invention shall not be explained in more detail below on the basis of the preferred exemplary embodiments thereof with reference to the accompanying drawings, in which.

DETAILED DESCRIPTION

Figure 1:
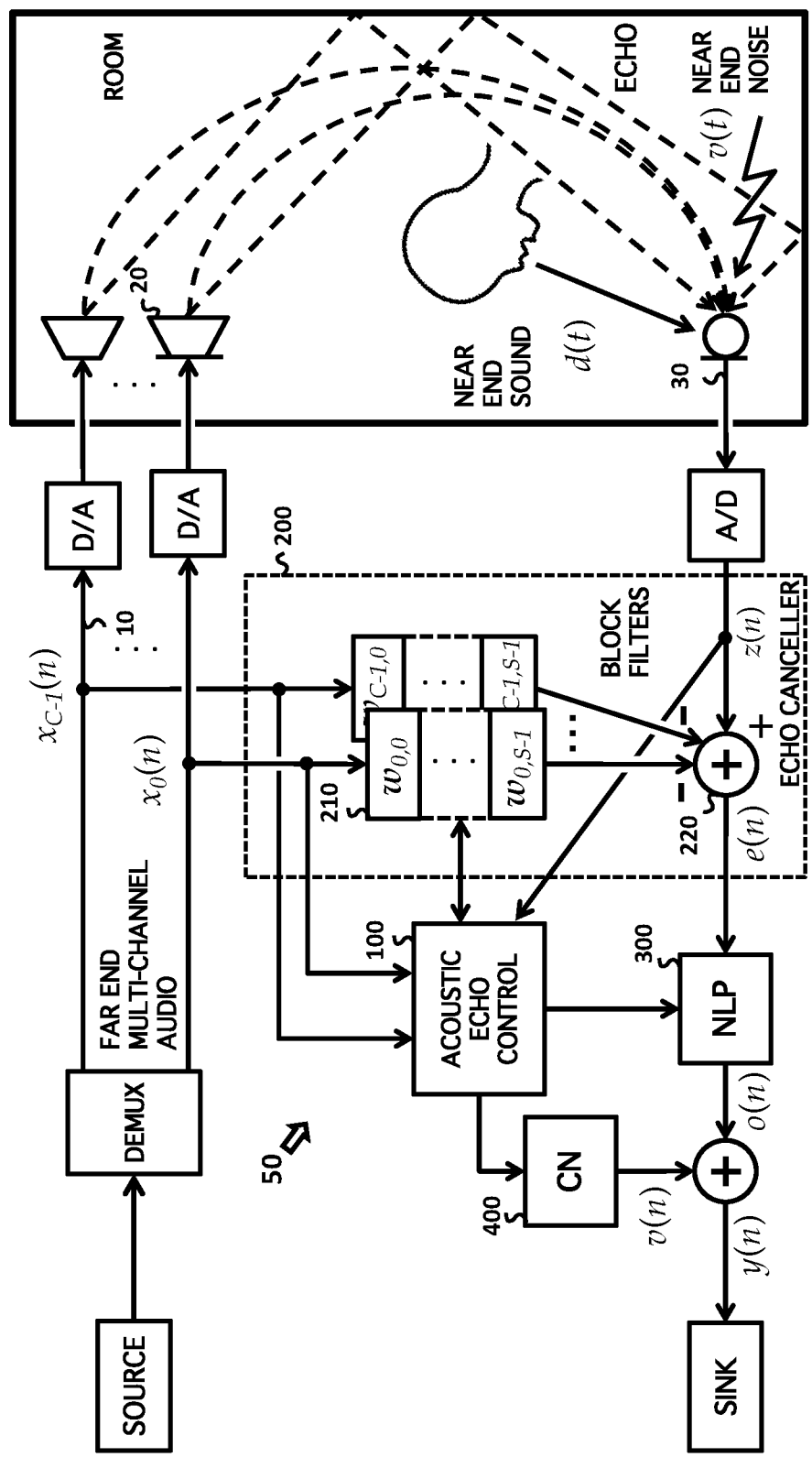
FIG. 1 illustrates the problem and scenario of multi-channel acoustic echo reduction.
Figure 2:
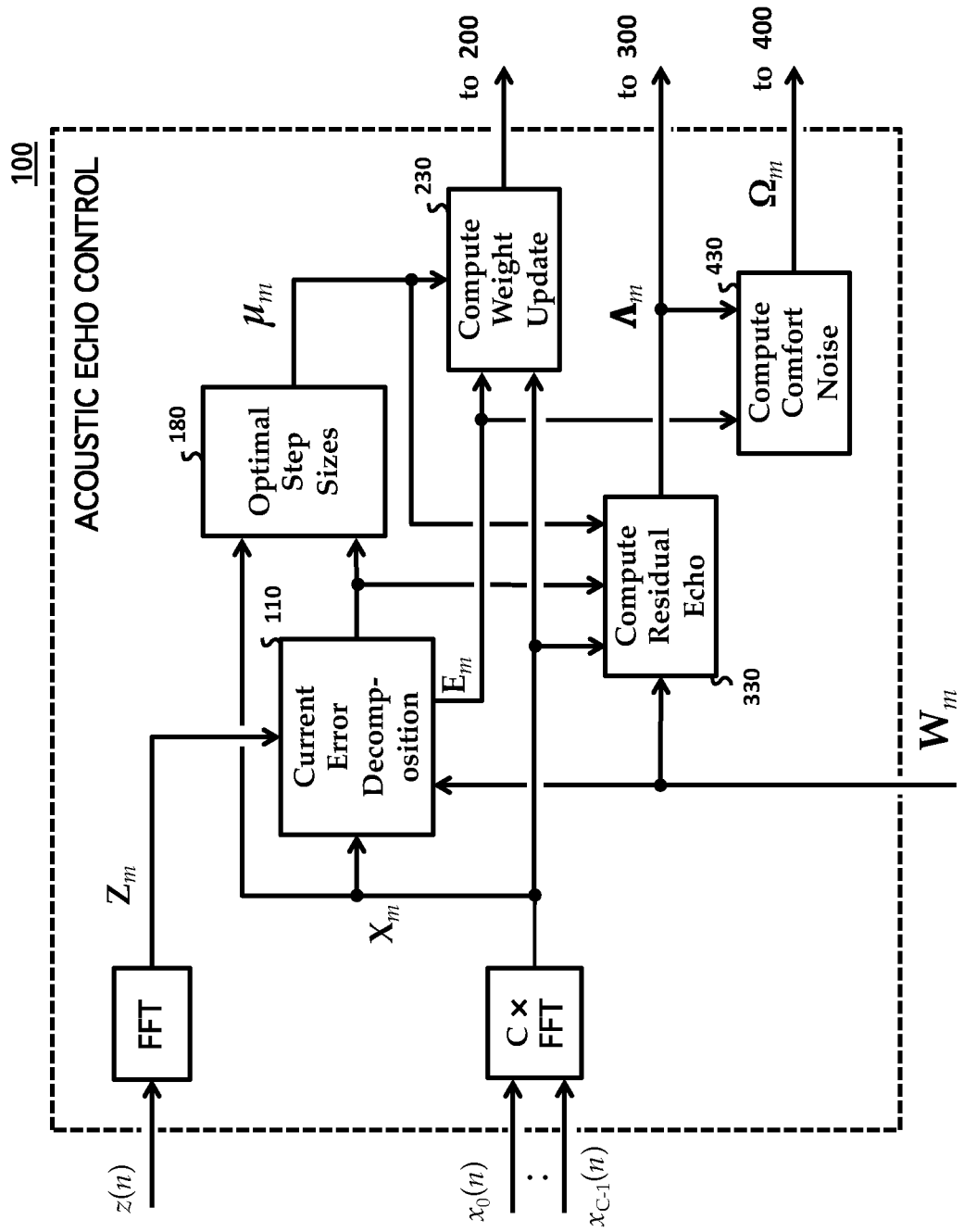
FIG. 2 illustrates the proposed computer-based system to control and update the multi-channel acoustic echo cancellation, the residual echo suppression, and the comfort noise injection at every time block.

In several embodiments of the present invention, a method and apparatus for multi-channel acoustic echo canceller 50 is disclosed, which governs a first stage of multi-filter adaptive echo cancellation 200 robust to near-end interferences and with improved update for each transversal filter, followed by a second stage of residual echo suppression 300 that re-duces the residual echo present in the canceller output to inaudible levels while preserving the quality of the main near-end signal, and followed by a third and last stage of comfort noise injection 400 that replenishes the suppressed near-end background noise with synthetic noise that resembles in level and spectrum said actual near-end background noise.

Acoustic Echo Cancellation

The output (4) of the multi-channel and multi-segment acoustic echo canceller 200 object of the present invention can be either obtained directly in the time domain (2) or with the frequency-domain mechanism (5). Regardless of the choice, the canceller 50 is trained in the frequency domain.

In the present invention, the frequency-domain coefficients of the i,jth filter, wherein i and j are channel and segment indices, respectively, are updated in 230 according to the rule $$W_{i,j}^{new} = W_{i,j} + \mathcal{T}_1\{\mu_{i,j,m} \circ E_m \circ X^*_{i,j,m}/(|X_{i,j,m}|^2 + \epsilon)\}, \quad (51)$$

wherein index m denotes the mth time block, that is, vector $E_m$ contains the frequency-domain conversion of M time-domain output samples $$E_m = F[0 \ldots, 0 \; e(m-1)M+1) \ldots e(mM)]^T, \quad (52)$$

while $X_{i,j,m}$ is built as follows $$X_{i,j,m} = F[x_{i,j}(mM-N+1) \ldots x_{i,j}(mM)]^T, \quad (53)$$

the operation $\mathcal{T}_1\{\;\}$ corresponds to the standard time-domain windowing to disregard invalid weight taps that result from the inherent circular convolution therein, see explanations after (10), $\epsilon > 0$ prevents division by zero or values near zero, and $\mu_{i,j,m}$ is the frequency-selective step size for the ith channel, jth segment, and mth time block. The appropriate selection of the step size(s) $\mu_{i,j,m}$, for i=0, . . . , C−1, and j=0, . . . , S−1, is important to guarantee stable and fast convergence of the adaptive echo canceller.

The canceller output at the mth time block can be represented as $$E_m = A_m + \sum_{i=0}^{C-1} \sum_{j=0}^{S-1} R_{i,j,m}, \quad (54)$$

wherein the first term $A_m$ comprises all non-cancellable components—see (11) for definitions—and the second term corresponds to the residual echoes $R_{i,j,m}$ yet to be cancelled.

A theoretical framework to combat interferences present in the canceller training error is to selectively update the frequency-domain filter coefficients based on the magnitude of the interference signals. For instance, an optimal frequency-domain (FD) step size for a single filter was deduced in "*A frequency-selective stepfactor control for an adaptive filter algorithm working in the frequency domain*" Signal Processing 80, September 2000. A novel application thereof in the context of the present invention is $$\mu_{i,j,m} = E\{|R_{i,j,m}|^2\}/E\{|E_m|^2\}, \quad (55)$$

wherein E{ } denotes statistical expectation. Another expression for an optimal FD step size found in "*A frequency domain step-size control method or LMS algorithms,*" IEEE Signal Processing Letters 17, February 2010. A novel application thereof in the context of the present invention is $$\mu_{i,j,m} = 1 - 1 - E\{|R_{i,j,m}|^2\}/E\{|E_m|^2\}. \quad (56)$$

Before proceeding further, it is worth mentioning that the standard update (9) is a particular case of the proposed update rule (51) when the frequency-domain step size is chosen as $$\mu_{i,j,m} = \mu |X_{i,j,m}|^2 / \left( \sum_{a=0}^{C-1} \sum_{b=0}^{S-1} |X_{a,b,m}|^2 \right). \quad (57)$$

Said standard step size (57) neither acknowledges different misalignment levels on each transversal filter $R_{i,j,m}$ nor the presence of the interfering non-cancellable term $A_m$. As result, the standard update exhibits slow and unstable convergence in most practical scenarios.

Computing the optimal frequency-domain step size as per (55) or (56) can be thus revamped into estimating the power spectral density of the interferences and the residual echoes. However, none of those C×S+1 unknown terms are directly measurable. The common belief for an expert in the art is that the effective and accurate estimation of the square magnitude of said terms $A_m$ and $R_{i,j,m}$, required in the evaluation of the optimal step size (55) or (56), is near to impossible.

We introduce hereby the following notation: $A_m(k)$ represents the kth frequency bin of the frequency-domain vector $A_m$, $E_m(k)$ represents the kth frequency bin of the frequency-domain vector $E_m$, and so on. The i,jth residual echo can be written as $$R_{i,j,m}(k) = G_{i,j}(k) X_{i,j,m}(k), \quad (58)$$

wherein $G_{i,j}(k)$ denotes the misalignment in the i,jth filter. We can assume the following statistical relations $$E\{G^*_{i,j}(k) A_m(k)\} = 0, \quad (59)$$

$$E\{G^*_{i,j}(k) G_{a,b}(k)\} = \begin{cases} E\{|G_{i,j}(k)|^2\}, & a=i, b=j \\ 0, & \text{otherwise} \end{cases}. \quad (60)$$

Based on the previous assumptions, the frequency-domain step as per (55) can be recast as follows $$\mu_{i,j,m}(k) = \frac{\Phi_{i,j}(k) X_{i,j,m}(k)}{\Psi_m(k) + \sum_{a=0}^{C-1} \sum_{b=0}^{S-1} \Phi_{a,b}(k) X_{a,b,m}(k)}, \quad (61)$$

wherein $\Phi_{i,j}(k)$ and $\Psi_m(k)$ are the power spectral density of the misalignment of each i,jth filter and that of the non-cancellable term respectively $$\Phi_{i,j}(k) = E\{|G_{i,j}(k)|^2\} \quad (62)$$

$$\Psi_m(k) = E\{|A_m(k)|^2\}, \quad (63)$$

and $X_{i,j,m}(k)$ is the expected power spectrum of the i,jth far-end signal at the mth block $$X_{i,j,m}(k) = E\{|X_{i,j,m}(k)|^2\}. \quad (64)$$

Said expected power spectrum (64) is optionally obtained from the power spectrum of a windowed signal block.

The method to accurately estimate said terms (62) and (63) disclosed in the present invention is carried out in 110 according to the reasoning and arguments exposed in what follows. It is known in the field of machine learning that the objective assessment of a learning machine, such as the set of adaptive filters of concern, must be performed on testing data statistically independent from the training data. This important axiom implies hereby that the weight update performed with the data from the mth time block can only be assessed with data from another time block, and never with the very mth block.

The immediately-preceding m−1th time block can act as such a "testing" block, hence not incurring any delay because said block is already available. Moreover, because both testing and updating time blocks are consecutive in time, the actual echo path at each one is considered to be the same, which is an important requirement for the inventive method to perform best. Other blocks from different times, i. e., an m−$\ell$th time block, wherein $\ell$ is an integer different than zero, could be used as long as the latter requirement is met. For ease of explanation, the in m−1th time block, e. g. $\ell = 1$, is used as an example in the following description.

Figure 3:
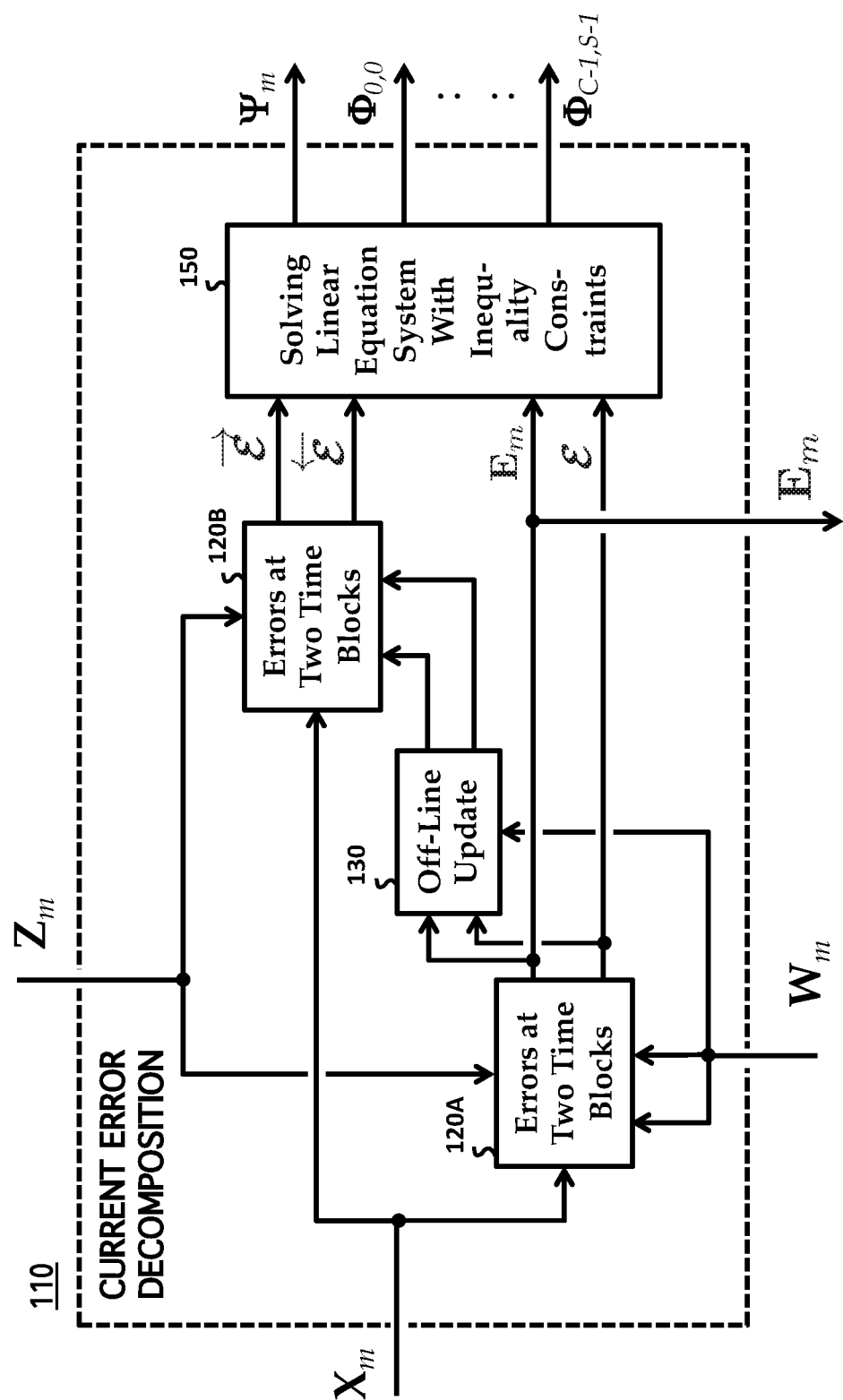
FIG. 3 illustrates the proposed computer-based apparatus to decompose the echo canceller output into the non-cancellable components and the residual echo for each channel and segment.
Figure 4:
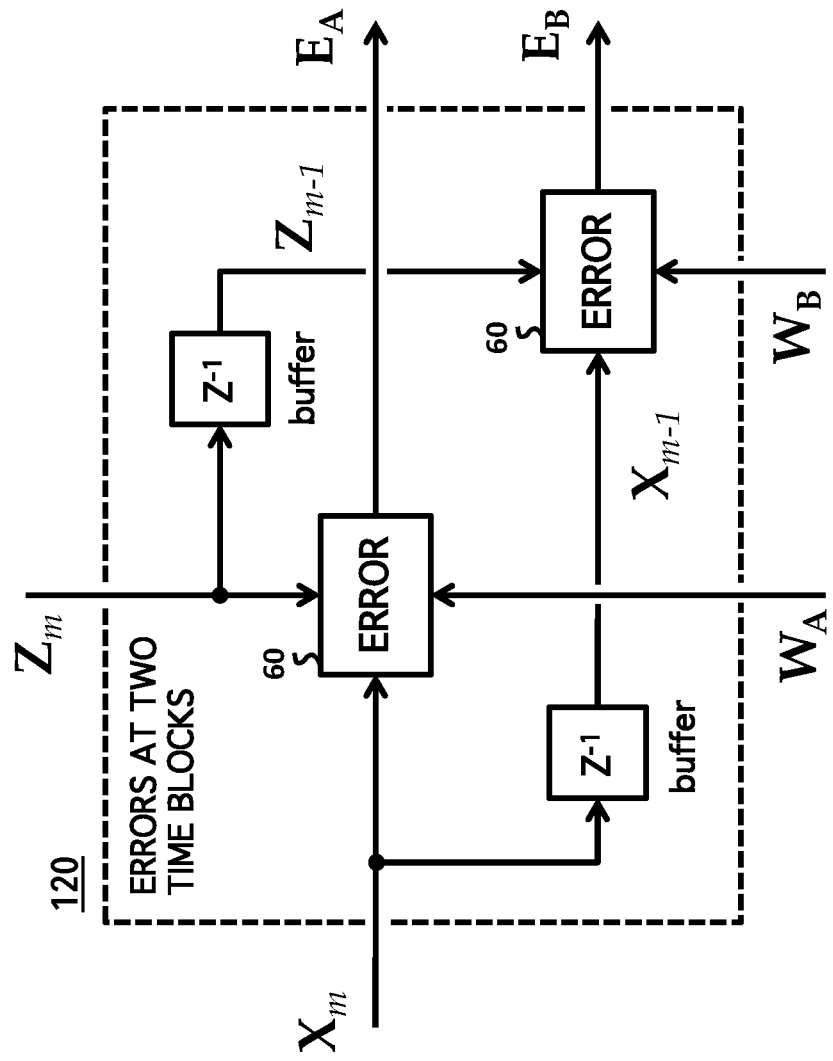
FIG. 4 discloses a computer-based method to compute the echo canceller errors at two different time blocks.

Supported on the embodiments from FIG. 3 and FIG. 4, in a first stage two errors are computed, namely the canceller output (e. g. error) over the mth tune-block $E_m$ in $$E_m = Z_m - \mathcal{T}_2 \left\{ \sum_{i=0}^{C-1} \sum_{j=0}^{S-1} W_{i,j} \circ X_{i,j,m} \right\}, \quad (65)$$

wherein $Z_m$ corresponds to the spectral samples of the microphone signal z(n) at the With block, the operator $\mathcal{T}_2\{\ \}$ corresponds to the time-domain windowing upon the filter operation to disregard invalid samples that result from the inherent circular convolution therein, see (8), (10) and (52) for explanations; and the "look-backward" error $\overleftarrow{\mathcal{E}}$, in 120B, obtained as follows: the canceller weights are updated in 130 according to the classical frequency-domain adaptive filtering rule (9) with said mth output $E_m$, and the impact thereof is assessed over the m−1th block, that is, $$\overleftarrow{\mathcal{E}} = Z_{m-1} - \mathcal{T}_2 \left\{ \sum_{i=0}^{C-1} \sum_{j=0}^{S-1} \left( W_{i,j} + \lambda \overleftarrow{\Omega_{i,j}} \right) \circ X_{i,j,m-1} \right\}, \quad (66)$$

wherein $Z_{m-1}$ corresponds to the spectral samples of the microphone signal z(n) at the m−1th block, and $\overleftarrow{\Omega}_{i,j}$ is the i, jth look-backward weight update $$\overleftarrow{\Omega_{i,j}} = \mathcal{T}_1\left\{E_m \circ X_{i,j,m}^* \bigg/ \left(\sum_{a=0}^{C-1}\sum_{b=0}^{S-1}|X_{a,b,m}|^2 + \epsilon\right)\right\}. \quad (67)$$

The constant $\lambda$ in (66) is the "overshoot" factor, to be addressed later.

A positive outcome from the previous operations is namely that the non-cancellable term $A_m$ can not only be observed in the mth error (65), as outlined in (54), but also in the look-backward error (66). However, the non-cancellable term $A_{m-1}$ at the in m−1th time block unfortunately appears in the look-backward error (66) as new unknown in the problem. This situation invites us to compute two additional errors, this time by swapping the training and testing time blocks. Hence, the m−1th error $\varepsilon$ is computed as $$\overleftarrow{\mathcal{E}} = Z_{m-1} - \mathcal{T}_2\left\{\sum_{i=0}^{C-1}\sum_{j=0}^{S-1}W_{i,j}\circ X_{i,j,m-1}\right\}, \quad (68)$$

and the "look-forward" error $\vec{\varepsilon}$ as $$\vec{\mathcal{E}} = Z_m - \mathcal{T}_2\left\{\sum_{i=0}^{C-1}\sum_{j=0}^{S-1}\left(W_{i,j} + \lambda\overrightarrow{\Omega_{i,j}}\right)\circ X_{i,j,m}\right\}, \quad (69)$$

wherein $\overrightarrow{\Omega_{i,j}}$ is the i,jth look-forward weight update $$\overrightarrow{\Omega_{i,j}} = \mathcal{T}_1\left\{\mathcal{E}\circ X_{i,j,m-1}^* \bigg/ \left(\sum_{a=0}^{C-1}\sum_{b=0}^{S-1}|X_{a,b,m-1}|^2 + \epsilon\right)\right\}. \quad (70)$$

The look-backward error (66) and look-forward error (69) can be also obtained in a compact fashion as $$\overleftarrow{\mathcal{E}} = \varepsilon - \lambda\overleftarrow{\Delta} \quad (71)$$

$$\vec{\mathcal{E}} = E_m - \lambda\vec{\Delta}, \quad (72)$$

wherein $\overleftarrow{\Delta}$ and $\vec{\Delta}$ and A are the impact of the look-backward and look-forward update respectively $$\overleftarrow{\Delta} = \mathcal{T}_2\left\{\sum_{i=0}^{C-1}\sum_{j=0}^{S-1}\overleftarrow{\Omega_{i,j}}\circ X_{i,j,m-1}\right\} \quad (73)$$

$$\vec{\Delta} = \mathcal{T}_2\left\{\sum_{i=0}^{C-1}\sum_{j=0}^{S-1}\overrightarrow{\Omega_{i,j}}\circ X_{i,j,m}\right\}. \quad (74)$$

In the prior art "Method and apparatus for updating filter coefficients of an adaptive echo canceller," EP 2930917 B1, disclosed by the author of the present invention, the evaluation of only three errors was thought sufficient to estimate the terms (62) and (63) for a single-channel single-segment echo canceller. However, such a strategy leads often to ill-conditioned problems because the presence of the unknown terms in the problem model is unbalanced. Including both the look-backward (77) and the look-forward (78) errors yields a balanced well-conditioned estimation problem.

In order to get the equations that relate said four errors $E_m$, $\varepsilon$, $\overleftarrow{\mathcal{E}}$, and $\vec{\varepsilon}$ with the unknown terms required to evaluate the optimal step size(s), said spectral errors (65) and (66) can be recast in term of the filter misalignment $G_{i,j}(k)$ as follows $$E_m(k) \equiv A_m(k) + \sum_{i=0}^{C-1}\sum_{j=0}^{S-1}G_{i,j}(k)X_{i,j,m}(k), \quad (75)$$

$$\mathcal{E}(k) \equiv A_{m-1}(k) + \sum_{i=0}^{C-1}\sum_{j=0}^{S-1}G_{i,j}(k)X_{i,j,m-1}(k), \quad (76)$$

$$\overleftarrow{\mathcal{E}}(k) \equiv A_{m-1}(k) + \sum_{i=0}^{C-1}\sum_{j=0}^{S-1}G_{i,j}(k)X_{i,j,m-1}(k) - \lambda\overleftarrow{\Delta}(k), \quad (77)$$

$$\vec{\mathcal{E}}(k) \equiv A_m(k) + \sum_{i=0}^{C-1}\sum_{j=0}^{S-1}G_{i,j}(k)X_{i,j,m}(k) - \lambda\vec{\Delta}(k), \quad (78)$$

wherein $\equiv$ denotes equivalency.

Translating the previous equation to power spectral densities finally leads to one of the main advantages of the invention. Supported on the assumptions of uncorrelation (59) and (60) between the terms involved, it can be concluded $$E\{|E_m(k)|^2\} = \Psi_m(k) + \sum_{i=0}^{C-1}\sum_{j=0}^{S-1}\mathcal{X}_{i,j,m}(k)\Phi_{i,j,m}(k) \quad (79)$$

$$E\{|\mathcal{E}(k)|^2\} = \Upsilon(k) + \sum_{i=0}^{C-1}\sum_{j=0}^{S-1}\mathcal{X}_{i,j,m-1}(k)\Phi_{i,j,m}(k), \quad (80)$$

wherein term $Y(k)=E\{|A_{m-1}(k)|^2\}$ is unknown and not used in the evaluation of the optimal step size(s) (61).

In order to translate the look-backward (77) and look-forward (78) errors to power spectral densities, the effect of the overshoot factor $\lambda$ needs to be first clarified. It can be deduced that the reduction of the filter misalignment (62) is ruled by the power factor $$f(\lambda)=\exp(-2\lambda+\lambda^2). \quad (81)$$

On the other hand, the update equations (77) and (78) yield the amplification of the non-cancellable terms $A_m$ and $A_{m-1}$ proportionally t $\lambda$, that is, its power (63) gets amplified by $$g(\lambda)=\lambda^2. \quad (82)$$

Figure 5:
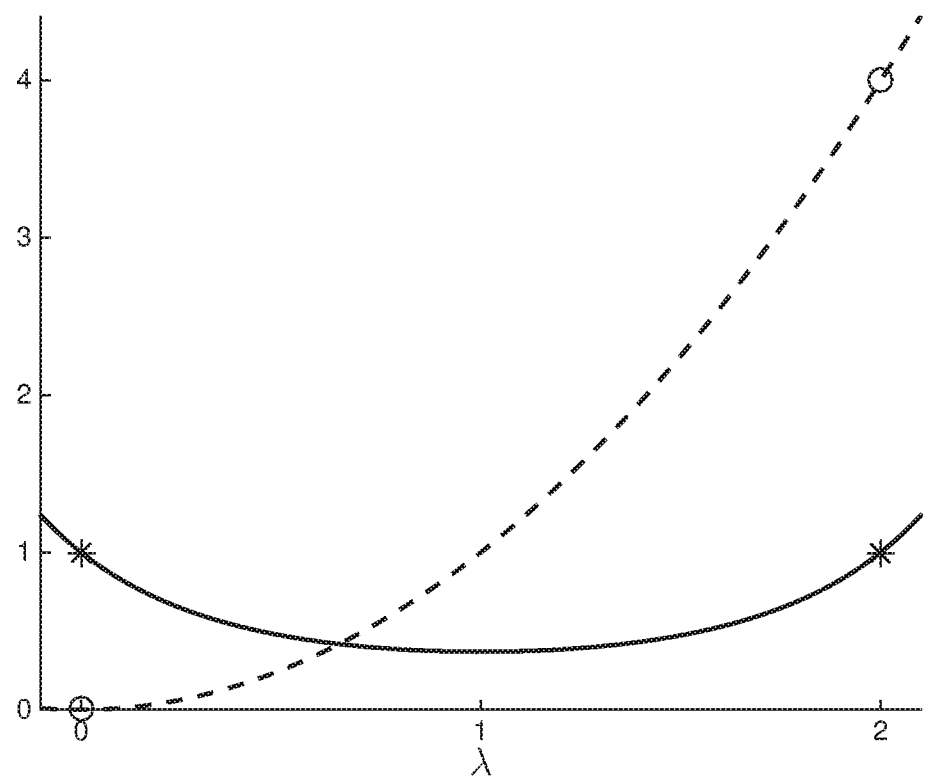
FIG. 5 illustrates the impact of the "overshoot" factor in the frequency-domain adaptive filter.

The illustration of this new tradeoff is brought in FIG. 5, wherein the solid line corresponds to (81), and the dashed line to (82). An attractive situation appears when $\lambda$ is set to two ($\lambda=2$): in this "overshoot" case, the expected misalignment level remains the same, $f(2)=1$, but the power of the non-cancellable term is amplified by a large factor, e. g. $g(2)=4$.

Such a value, $\lambda=2$, has never been used as step size in adaptive filtering because the resulting adaptive system would not converge. However, in the scope of this invention, said overshoot off-line update used in (77) and (78) makes the interference term $A_m$, as well as $A_{m-1}$, appear 6 dB larger in the look-backward error and look-forward error respectively. Henceforth, the value $\lambda=2$ is adopted in 130, but other $\lambda$ values can also be used as long as rules (81) and (82) are observed.

The power spectral densities of the set of spectral errors (78) can be thus written as $$E\{|\overleftarrow{\mathcal{E}}(k)|^2\} = \Upsilon(k) + 4\overleftarrow{T}(k)\Psi_m(k) + \sum_{i=0}^{C-1}\sum_{j=0}^{S-1}\Phi_{i,j}(k)\mathcal{X}_{i,j,m-1}(k) \quad (83)$$

$$E\{|\overrightarrow{\mathcal{E}}(k)|^2\} = \Psi_m(k) + 4\overrightarrow{T}(k)\Upsilon(k) + \sum_{i=0}^{C-1}\sum_{j=0}^{S-1}\Phi_{i,j}(k)\mathcal{X}_{i,j,m}(k), \quad (84)$$

wherein $\overleftarrow{T}(k)$ and $\overrightarrow{T}(k)$ are the normalized update in look-backward and look-forward errors respectively $$\overleftarrow{T}(k) = |\overleftarrow{\Delta}(k)|^2/|E_m(k)|^2 \quad (85)$$

$$\overrightarrow{T}(k) = |\overrightarrow{\Delta}(k)|^2/|\varepsilon(k)|^2. \quad (86)$$

Said four equations (79), (80), (83), and (84) are used to obtain the terms (62) and (63), which are required in the evaluation of the optimal frequency-domain step size(s). Said equations can be written as a system of linear equations subject to inequality constraints. Without loss of gener-ality we exemplify the solution system over a stereo scenario, $C=2$, with one segment per channel, $S=1$, in what follows $$\begin{bmatrix} 1 & 0 & \mathcal{X}_{0,0,m-1}(k) & \mathcal{X}_{1,0,m-1}(k) \\ 0 & 1 & \mathcal{X}_{0,0,m}(k) & \mathcal{X}_{1,0,m}(k) \\ 1 & 4\overleftarrow{T}(k) & \mathcal{X}_{0,0,m-1}(k) & \mathcal{X}_{1,0,m-1}(k) \\ 4\overrightarrow{T}(k) & 1 & \mathcal{X}_{0,0,m}(k) & \mathcal{X}_{1,0,m}(k) \end{bmatrix} \begin{bmatrix} \Upsilon(k) \\ \Psi_m(k) \\ \Phi_{0,0}(k) \\ \Phi_{1,0}(k) \end{bmatrix} = \begin{bmatrix} |\mathcal{E}(k)|^2 \\ |E_m(k)|^2 \\ |\overleftarrow{\mathcal{E}}(k)|^2 \\ |\overrightarrow{\mathcal{E}}(k)|^2 \end{bmatrix}$$

subject to $$\Upsilon(k) > 0, \Psi_m(k) > 0, \Phi_{0,0}(k) > 0, \Phi_{1,0}(k) > 0. \quad (87)$$

Said inverse linear problem with inequality constraints (87) requires an iterative methodology such as linear programming. In order to speed up the process (to reduce the number of iterations), a good initial guess is welcome. The very solution obtained at the previous m−1th time block can serve as said initialization. The solution to (87) is computed in 150.

At this point it is important to remark that the m−$\ell$ th time block precedes the mth one, e. g. $\ell > 0$ and in particular $\ell = 1$. Adopting a negative value, $\ell < 0$, would incur an undesired processing delay, as the m−$\ell$ th time block would be yet to come after the mth one. However, that option does not actually differ in essence from said case because both time blocks serve as training and testing data on any of the look-forward/-backward errors: because of this symmetry in the solution system (87), the option $\ell < 0$ becomes moot.

It is important to point out that any sub-matrix in (87) involving only $\Psi_m(k)$ and $\Upsilon(k)$ has full rank, e. g. the solution obtained for the non-cancellable terms is accurate. This proves theoretically that the resulting step size provides "instantaneous" robustness against double-talk, which was one of the major challenges yet to be effectively solved by the state of the art.

On the other hand, the estimation of the filter misalignment becomes ill-conditioned as the number of filters increases. In the practice, the solution accomplished with a normal initialization, such as that from the m−1th block, outperforms the state of art. Nonetheless, in order to improve the condition of this problem when the number of channels or the number of segments per channel is large, a second embodiment of the invention is disclosed in what follows.

Improving the estimation accuracy for the misalignment power requires evaluating at most two additional errors, and including the resulting linear equations into the original system. The strategy behind this methodology is namely not to treat said r,sth filter as part of the adaptive system, e. g. to consider its misalignment as a non-cancellable "interference" term, and to update off-line all canceller filters but the r,sth one, resulting in the additional look-backward error $$\overleftarrow{\mathcal{E}}_{r,s} = \varepsilon - \lambda \overleftarrow{\Delta}_{r,s} \quad (88)$$

wherein $\overleftarrow{\Delta}_{r,s}$ is the impact of a look-backward filter update except for the (r,s) th filter $$\overleftarrow{\Delta}_{r,s} = \mathcal{T}_2\left\{\sum_{i}^{i \neq r \& j \neq s}\sum_{j}\mathcal{T}_1\left\{E_m \circ X_{i,j,m}^* \Big/ \left(\sum_{a}^{a \neq r \& b \neq s}\sum_{b}|X_{a,b,m}|^2\right)\right\} \circ X_{i,j,m-1}\right\}, \quad (89)$$

and the additional look-forward error $$\overrightarrow{\varepsilon}_{r,s} = \varepsilon - \lambda \overrightarrow{\Delta}_{r,s} \quad (90)$$

wherein $\overrightarrow{\alpha}_{r,s}$ is the impact of a look-forward filter update except for the (r,s)th filter $$\overrightarrow{\Delta}_{r,s} = \mathcal{T}_2\left\{\sum_{i}^{i \neq r \& j \neq s}\sum_{j}\mathcal{T}_1\left\{\mathcal{E} \circ X_{i,j,m-1}^* \Big/ \left(\sum_{a}^{a \neq r \& b \neq s}\sum_{b}|X_{a,b,m-1}|^2\right)\right\} \circ X_{i,j,m}\right\}. \quad (90)$$

The additional look-backward error $\overleftarrow{\mathcal{E}}_{r,s}$ and look-forward error $\overrightarrow{\varepsilon}_{r,s}$ for $\lambda=2$, bring two important additional relations $$E\{|\overleftarrow{\mathcal{E}}_{r,s}(k)|^2\} = \Psi_{m-1}(k) + 4\overleftarrow{T}_{r,s}(k)\Psi_m(k) + \quad (92)$$
$$4\overleftarrow{T}_{r,s}(k)\Phi_{r,s}(k)\mathcal{X}_{r,s,m}(k) + \sum_{i=0}^{C-1}\sum_{j=0}^{S-1}\Phi_{i,j}(k)\mathcal{X}_{i,j,m-1}(k)$$

$$E\{|\overrightarrow{\mathcal{E}}_{r,s}(k)|^2\} = \Psi_m(k) + 4\overrightarrow{T}_{r,s}(k)\Psi_{m-1}(k) + \quad (93)$$
$$4\overrightarrow{T}_{r,s}(k)\Phi_{r,s}(k)\mathcal{X}_{r,s,m-1}(k) + \sum_{i=0}^{C-1}\sum_{j=0}^{S-1}\Phi_{i,j}(k)\mathcal{X}_{i,j,m}(k),$$

wherein $$\overleftarrow{T}_{r,s}(k) = |\overleftarrow{\Delta}_{r,s}(k)|^2/|E_m(k)|^2 \quad (94)$$

$$\overrightarrow{T}_{r,s}(k) = |\overrightarrow{\Delta}_{r,s}(k)|^2/|\varepsilon(k)|^2. \quad (95)$$

Said four equations (79), (80), (83), (84), in addition to (92) and (93), embody the main algorithmic foundations to obtain the terms (62) and (63). For the sake of simplicity let us consider a one-chanenel system, C=1, composed of two segments, S=2. Since the filter $W_{0,0}$ of the first segment takes care of the early echoes, which are prone to change and have larger energy than the late ones, it is desired to improve the tracking performance for said filter. For the sake of simplicity, we drop the frequency bin index k whenever convenient, that is denotes $X_{i,j,m}$ denotes $X_{i,j,m}(k)$, and so on, the final solution system results as follows $$\begin{bmatrix} 1 & 0 & X_{0,0,m-1} & X_{0,1,m-1} \\ 0 & 1 & X_{0,0,m} & X_{0,1,m} \\ 1 & 4\overleftarrow{T} & X_{0,0,m-1} & X_{0,1,m-1} \\ 4\overrightarrow{T} & 1 & X_{0,0,m} & X_{0,1,m} \\ 1 & 4\overleftarrow{T}_{0,0} & 4\overleftarrow{T}_{0,0}X_{0,0,m}+X_{0,0,m-1} & X_{0,1,m-1} \\ 4\overrightarrow{T}_{0,0} & 1 & 4\overrightarrow{T}_{0,0}X_{0,0}^{m-1}+X_{0,0,m} & X_{0,1,m} \end{bmatrix} \begin{bmatrix} Y \\ \Psi_m \\ \Phi_{0,0} \\ \Phi_{0,1} \end{bmatrix} = \begin{bmatrix} |\varepsilon|^2 \\ |E_m|^2 \\ |\overleftarrow{\varepsilon}|^2 \\ |\overrightarrow{\varepsilon}|^2 \\ |\overleftarrow{\varepsilon_{0,0}}|^2 \\ |\overrightarrow{\varepsilon_{0,0}}|^2 \end{bmatrix}$$

subject to $$Y(k)>0, \Psi_m(k)>0, \Phi_{0,0}(k)>0, \Phi_{0,1}(k)>0. \quad (96)$$

The misalignment $\Phi_{0,0}(k)$ is observed in the look-backward/-forward errors $\overleftarrow{\varepsilon_{0,0}}(k)$ and $\overrightarrow{\varepsilon_{0,0}}(k)$ with a gain of 6 dB. It is evident for anyone familiar with the art that the inclusion of said two additional equations, that is, the last two rows in (96), improves the condition of the problem.

The solution to (96) is computed in 150. Upon said solution, the optimal FD step size as per (56) is evaluated in 180 as follows $$\mu_{i,j,m}(k) = 1 - \sqrt{1 - \frac{\Phi_{i,j,m}(k)X_{i,j,m}(k)}{\Psi_m(k) + \sum_{a=0}^{C-1}\sum_{b=0}^{S-1} \Phi_{a,b,m}(k)X_{a,b,m}(k)}}. \quad (97)$$

Residual Echo Suppression

Due to very long echo paths, to an adaptive system in early convergence, or to non-linear phenomena, echo components in the canceller output (11) may still be audible. The non-linear processing (NLP) 300 aims to suppress the residual echo components still present in the canceller output to inaudible levels while preserving the integrity of the main near-end sounds as much as possible. In order to perform an effective NLP, accurate estimation of the residual echo in level and spectrum is important.

The residual echo present in the canceller output (11) is composed of the terms $R_m(k)$, $Q_m(k)$ and $P_m(k)$. As said terms are uncorrelated with each other, the estimated power spectrum of the residual echo is built additively in 330 as follows $$\Lambda_m(k) = \mathcal{R}_m(k) + \mathcal{Q}_m(k) + \mathcal{P}_m(k), \quad (98)$$

wherein $\mathcal{R}_m(k)$, $\mathcal{Q}_m(k)$, and $\mathcal{P}_m(k)$ are the estimated power spectrum of every term in the residual echo respectively, The power spectrum of the residual echo due to filter misalignment is readily given by $$\mathcal{R}_m(k) = E\{|R_m(k)|^2\} = \sum_{i=0}^{C-1}\sum_{j=0}^{S-1} \Phi_{i,j}(k)X_{i,j,m}(k), \quad (99)$$

wherein $\Phi_{i,j}(k)$ is outcome of the generic decomposition problem (96).

The power spectrum of the residual echo due to long acoustic echo paths ($L_H \gg S \times L$) can be defined as follows $$\mathcal{Q}_m(k) = E\{|Q_m(k)|^2\} = \sum_{i=0}^{C-1}\sum_{j=S}^{\infty} |W_{i,j}(k)|^2 X_{i,j,m}(k), \quad (100)$$

wherein $W_{i,j}(k)$ for j=S, . . . , represent filters beyond the time scope of the canceller, hence unknown "virtual" filters. Said terms in (100) can be approximated according to the reasoning that follows.

Echo paths present typically an exponential decay especially in the last part of its impulse response. The time-domain filter $w_{i,S-1}(n)$, regardless of the channel, is thus assumed to follow the model $$E\{\log|w_{i,S-1}(n)|^2\} = -\tau n + a, \quad (101)$$

wherein $\tau$ is the time constant related to said filter, and the level a is not relevant henceforth; the time constant $\tau$ can be simply obtained with linear regression over said square filter weights in logarithm scale, as pointed out in (101). The power spectrum of said "virtual" filters in (100) can be thus approximated as $$|W_{i,S-1+\alpha}(k)|^2 \simeq \gamma^\alpha |W_{i,S-1}(k)|^2, \quad (102)$$

wherein $W_{i,S-1}(k)$ is an existing filter, $\alpha \geq 1$ is an integer, and $\gamma = \exp(-\tau L)$. By replacing (102) into (100), and because $X_{i,j,m}(k) = X_{i,j-1,m-1}(k)$, the power spectrum of the residual echo beyond the canceller scope is obtained with the following accumulative formula $$\mathcal{Q}_m(k) = \gamma \mathcal{Q}_{m-1}(k) + \gamma \sum_{i=0}^{C-1} |W_{i,S-1}(k)|^2 X_{i,S-1,m-1}(k), \quad (103)$$

wherein all elements involved in said formula are available.

Finally, the non-linear echo components are correlated to the input signals $x_i(n)$ somewhat in an unpredictable way. This means that the adaptive filter usually jitters or fluctuates when non-linear echo is present in the training error. Based on the misalignment $\Phi_{i,j}(k)$ and step size $\mu_{i,j,m}(k)$ obtained from the decomposition problem (96), the non-linear residual echo is readily obtained as follows $$\mathcal{P}_m(k) \propto \sum_{i=0}^{C-1}\sum_{j=0}^{S-1} \mu_{i,j,m}(k)\Phi_{i,j}(k)X_{i,j,m}(k), \quad (104)$$

wherein $\propto$ denotes proportional to.

Upon the estimated overall residual echo $\Lambda_m(k)$, several ways to carry out the NLP operation by 300 are available, such as with the Wiener filter, minimum mean-square error, perceptual enhancement, et cetera. As example, the Wiener filter can be approximated as follows $$B_m(k) = \left\lfloor \frac{|E_m(k)|^2 - \Lambda_m(k)}{|E_m(k)|^2} \right\rfloor_\varepsilon, \quad (105)$$

wherein $\lfloor \ \rfloor_\varepsilon$ denotes low clipping by $\varepsilon > 0$. Finally, the frequency-domain output of the acoustic echo control system is obtained by $$O_m(k) = E_m(k) B_m(k). \quad (106)$$

In order to deliver a listening signal, the frequency-domain output $O_m(k)$ is transformed to the time domain. Standard overlap-add processing must be considered to avoid block-effects in the resulting output. Said processing is well known to any person familiar with the art.

Comfort Noise Injection

The echo cancellation 200 along with the NLP operation 300 delivers an echo-free output (first Objective in echo control), that is $$O_m(k) \approx D_m(k) B_m(k) + V_m(k) B_m(k). \quad (107)$$

Since the magnitude of the residual echo is significantly lower than that of the main near-end signal, hence $D_m(k) B_m(k) \approx D_m(k)$, the main near-end signal goes through nearly undistorted upon the NLP (second objective in echo control). We can thus approximate the previous output (107) as $$O_m(k) \approx D_m(k) + V_m(k) B_m(k). \quad (108)$$

However the near-end background noise in (108), e. g. $V_m(k) B_m(k)$, suffers fluctuations in level and spectrum. In order to replenish the background noise in 400 as per (13) or equivalent technique and deliver the so same perceptual impression (third and last objective in echo control), accurate estimation thereof in level and spectrum is important.

In case of far-end inactivity (an event that is straightforward to detect), hence $B_m(k)=1$, the background noise can be estimated from the power spectrum $|O_m(k)|=1$, during (short) periods of silence. However, the injection of comfort noise is actually required in the opposite case, that is, during far-end activity, hence $0 \leq B_m(k) < 1$. Therefore, being able to track the background noise on any situation, hence from the original canceller output $E|E_m(k)|^2$, represents the main challenge to address hereby.

The usual approach to background noise estimation is to obtain the power spectral floor from the most recent K canceller outputs $$\Gamma_m(k) = \{|E_m(k)|^2, |E_{m-1}(k)|^2, \ldots, |E_{m-K+1}(k)|^2\} \quad (109)$$

either by averaging selected items within $\Gamma_m$, or with minimum statistics over the set $\Gamma_m(k)$, et cetera. Let $\mathcal{N}\{\Gamma_m(k)\}$, denote a generic method to obtain said spectral floor from the sets $\Gamma_m(k)$.

The present invention proposes to estimate the power spectrum of the background noise in 430 according to $$\Omega_m(k) = \lfloor \mathcal{N}\{\Gamma_m(k)\} - \mathcal{L}\{\mathcal{N}_m(k)\} \rfloor_{\delta(k)} \quad (110)$$

wherein $\delta(k)$ represents the minimum comfort noise for the kth frequency bin, and $\mathcal{L}_m(k)$ contains the K most recent time spectral snapshots of the residual echo power, obtained with (98) during the NLP phase $$\mathcal{L}_m(k) = \{\Lambda_m(k), \Lambda_{m-1}(k), \ldots, \Lambda_{m-k+1}(k)\}. \quad (111)$$

The proposed rule (110) involves the computation of a spectral floor "two times", once for the set $\Gamma_m(k)$ and then for $\mathcal{E}_m(k)$. Although it demands larger computational complexity it delivers accurate results. Evaluating only one spectral floor over the difference set $\Gamma_m(k) - \mathcal{L}_m(k)$ does not lead in general to the same result, that is $$\lfloor \mathcal{N}\{\Gamma_m(k)\} - \mathcal{N}\{\mathcal{L}_m(k)\} \rfloor_{\delta(k)} \neq \mathcal{N}\{\lfloor \Gamma_m(k) - \mathcal{L}_m(k) \rfloor_{\delta(k)}\}. \quad (112)$$

The invention is not restricted to the specific embodiments described in detail herein, but encompasses all variants, combinations and modifications thereof that fall within the framework of the appended claims.

What is claimed is:

1. A computer-implemented method for updating at least one frequency-domain filter coefficient $W_{i,j}(k)$ of an echo canceller having at least one channel and at least one segment per channel, the filter coefficients of the echo canceller being updateable in the frequency domain at a time block m comprising:

determining a canceller output $E_m(k)$ over the mth time block as the difference between $Z_m(k)$ and a cancelling term based on $$\sum_{i=0}^{C-1} \sum_{j=0}^{S-1} W_{i,j}(k) X_{i,j,m}(k);$$

determining a canceller error $\varepsilon(k)$ over the m–$\ell$ th time block as the difference between $Z_{m-\ell}(k)$ and a cancelling term based on $$\sum_{i=0}^{C-1} \sum_{j=0}^{S-1} W_{i,j}(k) X_{i,j,m-\ell}(k);$$

determining a look-backward error $\overleftarrow{\varepsilon}(k)$ as $$\overleftarrow{\varepsilon}(k) = \varepsilon(k) - \lambda \overleftarrow{\Delta}(k),$$

wherein $\overleftarrow{\Delta}(k)$ is based on $$\sum_{i=0}^{C-1} \sum_{j=0}^{S-1} \frac{E_m(k) X^*_{i,j,m}(k)}{\sum_{a=0}^{C-1} \sum_{b=0}^{S-1} |X_{a,b,m}(k)|^2 + \epsilon} X_{i,j,m-\ell}(k);$$

determining a look-forward error $\vec{\varepsilon}(k)$ as $$\vec{\varepsilon}(k) = E_m(k) - \lambda \vec{\Delta}(k),$$

wherein $\vec{\Delta}(k)$ is based on $$\sum_{i=0}^{C-1} \sum_{j=0}^{S-1} \frac{\mathcal{E}(k) X^*_{i,j,m-\ell}(k)}{\sum_{a=0}^{C-1} \sum_{b=0}^{S-1} |X_{a,b,m-\ell}(k)|^2 + \epsilon} X_{i,j,m}(k);$$

determining an optimal update step size $\mu_{i,j,m}(k)$ from said canceller output $E_m(k)$ over the mth time block, from said canceller error ε(k) over the m−$\ell$ th time block, from said look-backward error $\overleftarrow{\varepsilon}$ (k), and from said look-forward error $\overrightarrow{\varepsilon}$ (k) and updating said at least one filter coefficient $W_{i,j}$(k) by using said optimal update step-size $\mu_{i,j,m}$(k);

wherein

C corresponds to the number of channels i=0, . . . , C−1 of the echo canceller,

S corresponds to the number of segments j=0, . . . , S−1 per channel of the echo canceller, $\ell$ is an integer different than zero, k denotes a frequency bin index, ϵ is a positive value, $Z_m$(k) corresponds to the kth spectral bin of a microphone signal at the mth time block, $Z_{m-\ell}$(k) corresponds to the kth spectral bin of the microphone signal at the m−$\ell$ time block, $X_{i,j,m}$(k) corresponds to the kth spectral bin of a far-end signal at the ith channel, jth segment, and mth time block, $X_{i,j,\ m-\ell}$(k) corresponds to the kth spectral bin of the far-end signal at the ith channel, jth segment, and m−$\ell$ th time block, λ is an overshoot factor, and a, b are channel and segment indices, respectively.

2. The method according to claim 1, wherein the optimal step size $\mu_{i,j,m}$(k) is computed by either $$\mu_{i,j,m}(k) = \frac{\Phi_{i,j}(k)\mathcal{X}_{i,j,m}(k)}{\Psi_m(k) + \sum_{a=0}^{C-1}\sum_{b=0}^{S-1}\Phi_{a,b}(k)\mathcal{X}_{a,b,m}(k)}$$

or $$\mu_{i,j,m}(k) = 1 - \sqrt{1 - \frac{\Phi_{i,j}(k)\mathcal{X}_{i,j,m}(k)}{\Psi_m(k) + \sum_{a=0}^{C-1}\sum_{b=0}^{S-1}\Phi_{a,b}(k)\mathcal{X}_{a,b,m}(k)}},$$

wherein $\Psi_m$(k) is a power spectrum of the non-cancellable components at the mth time block and $\Phi_{i,j}$(k) is a power spectrum of the misalignment of each i,jth filter, wherein $\Psi_m$(k) and $\Phi_{i,j}$(k) are determined by solving the set of linear equations $$\Psi_m(k) + \sum_{i=0}^{C-1}\sum_{j=0}^{S-1}\mathcal{X}_{i,j,m}(k)\Phi_{i,j}(k) = |E_m(k)|^2$$

$$\Upsilon(k) + \sum_{i=0}^{C-1}\sum_{j=0}^{S-1}\mathcal{X}_{i,j,m-\ell}(k)\Phi_{i,j}(k) = |\mathcal{E}(k)|^2$$

$$\Upsilon(k) + 4\overleftarrow{T}(k)\Psi_m(k) + \sum_{i=0}^{C-1}\sum_{j=0}^{S-1}\mathcal{X}_{i,j,m-\ell}(k)\Phi_{i,j}(k) = |\overleftarrow{\mathcal{E}}(k)|^2$$

$$4\overrightarrow{T}(k)\Upsilon(k) + \Psi_m(k) + \sum_{i=0}^{C-1}\sum_{j=0}^{S-1}\mathcal{X}_{i,j,m}(k)\Phi_{i,j}(k) = |\overrightarrow{\mathcal{E}}(k)|^2$$

subject to inequality constraints $Y(k)>0,\Psi_m(k)>0,\Phi_{0,0}(k)>0, \ldots ,\Phi_{C-1,S-1}(k)>0;$ wherein $X_{i,j,m}$(k) corresponds to the kth power spectral bin of the far-end signal at the ith channel, jth segment, and mth time block, $X_{i,j,\ m-\ell}$(k) corresponds to the kth power spectral bin of the far-end signal at the ith channel, jth segment, and m−$\ell$ th time block, Y(k) corresponds to the kth power spectral bin of the non-cancellable components at the m−$\ell$ th block, $\overleftarrow{T}$(k) is the normalized look-backward update, computed as $$\overleftarrow{T}(k) = \overleftarrow{\Delta}(k)/|E_m(k)|^2,$$

and $\overrightarrow{T}$(k) is the normalized look-forward update, computed as $$\overrightarrow{T}(k) = \overrightarrow{\Delta}(k)/|\varepsilon(k)|^2.$$

3. The method according to claim 2, wherein at least one of the number of channels and the number of segments per channel is larger than one; and the optimal step size $\mu_{i,j,m}$(k) is determined from said canceller output $E_m$(k) over the mth time block, from said canceller error ε(k) over the m−$\ell$ th time block, from said look-backward error $\overleftarrow{\varepsilon}$ (k), from said look-forward error $\overrightarrow{\varepsilon}$ (k) as well as from at least one additional look-backward error $\overleftarrow{\varepsilon_{r,s}}$ (k) and from at least one additional look-forward error $\overrightarrow{\varepsilon_{r,s}}$(k) for at least one r,sth filter, r and s being indices of the channel and the segment, respectively, wherein $$\overleftarrow{\varepsilon_{r,s}}(k) = \varepsilon(k) - \lambda\overleftarrow{\Delta_{r,s}}(k),$$

wherein $\overleftarrow{\Delta_{r,s}}$ (k) is based on $$\sum_i^{i \neq r \& j \neq s}\sum_j \frac{E_m(k)X_{i,j,m}^*(k)}{\sum_a^{a \neq r \& b \neq s}\sum_b |X_{a,b,m}(k)|^2 + \epsilon}X_{i,j,m-\ell}(k),$$

and $$\overrightarrow{\varepsilon_{r,s}}(k) = E_m(k) - \lambda\overrightarrow{\Delta_{r,s}}(k),$$

wherein $\overrightarrow{\Delta_{r,s}}$(k) is based on $$\sum_i^{i \neq r \& j \neq s}\sum_j \frac{\mathcal{E}(k)X_{i,j,m-\ell}^*(k)}{\sum_a^{a \neq r \& b \neq s}\sum_b |X_{a,b,m-\ell}(k)|^2 + \epsilon}X_{i,j,m}(k).$$

4. The method according to claim 2, wherein the power spectrum $\Psi_m$(k) of the non-cancellable components and the power spectrum $\Phi_{i,j}$(k) of the misalignment of each i,jth filter are determined by solving said set of linear equations with additional linear equations for the at least one r,sth filter $$\Upsilon(k) + 4\overleftarrow{T}_{r,s}(k)\Psi_m(k) + 4\overleftarrow{T}_{r,s}(k)\mathcal{X}_{r,s,m}(k)\Phi_{r,s}(k) + +\sum_{i=0}^{C-1}\sum_{j=0}^{S-1}\mathcal{X}_{i,j,m-1}(k)\Phi_{i,j}(k) =$$

$$|\overleftarrow{\mathcal{E}_{r,s}}(k)|^2$$

-continued $$\Psi_m(k) + 4\overleftarrow{T}_{r,s}(k)Y(k) + 4\overrightarrow{T}_{r,s}(k)X_{r,s,m-1}(k)\Phi_{r,s}(k) + + \sum_{i=0}^{C-1}\sum_{j=0}^{S-1} X_{i,j,m}(k)\Phi_{i,j}(k) = |\overrightarrow{\mathcal{E}}_{r,s}(k)|^2$$

subject to inequality constraints $$Y(k)>0, \Psi_m(k)>0, \Phi_{0,0}(k)>0, \ldots, \Phi_{C-1,S-1}(k)>0;$$

wherein
$\overleftarrow{T}_{r,s}(k)$ is the normalized look-backward update excluding the r,sth filter, computed as $$\overleftarrow{T}_{r,s}(k) = \overleftarrow{\Delta}_{r,s}(k)/|E_m(k)|^2,$$

and
$\overrightarrow{T}_{r,s}(k)$ is the normalized look-forward update excluding the r,sth filter, computed as $$\overrightarrow{T}_{r,s}(k) = \overrightarrow{\Delta}_{r,s}(k)/|\varepsilon(k)|^2.$$

5. The method according to claim 1, wherein the overshoot factor $\lambda$ is in the range $1<\lambda\leq 2$.

6. The method according to claim 1, characterized by determining a power spectrum $R_m(k)$ of the residual echo due to filter misalignment at the mth block by means of $$\mathcal{R}_m(k) = \sum_{i=0}^{C-1}\sum_{j=0}^{S-1} \Phi_{i,j}(k)X_{i,j,m}(k),$$

and subsequently an improved canceller output $O_m(k)$ based on the canceller output $E_m(k)$ and on said determined power spectrum $R_m(k)$ of the residual echo due to the filter misalignment.

7. The method according to claim 1, characterized by determining a power spectrum $Q_m(k)$ of the echo beyond the canceller's time scope at the mth block by means of the accumulative method $$\mathcal{Q}_m(k) = \gamma\mathcal{Q}_{m-1}(k) + \gamma\sum_{i=0}^{C-1} |W_{i,S-1}(k)|^2 X_{i,S-1,m-1}(k),$$

wherein $0<\gamma<1$,
and subsequently an improved canceller output $O_m(k)$ based on the canceller output $E_m(k)$ and on said determined power spectrum $Q_m(k)$ of the echo beyond the canceller's time scope.

8. The method according to claim 1, characterized by determining a power spectrum $P_m(k)$ of the non-linear echo components at the mth block by means of $$\mathcal{P}_m(k) \propto \sum_{i=0}^{C-1}\sum_{j=0}^{S-1} \mu_{i,j,m}(k)\Phi_{i,j}(k)X_{i,j,m}(k),$$

wherein $\alpha$ denotes proportional,
and subsequently an improved canceller output $O_m(k)$ based on the canceller output $E_m(k)$ and on said determined power spectrum $P_m(k)$ of the non-linear echo components.

9. The method according to claim 1, wherein the method determines an improved canceller output $O_m(k)$ as $$O_m(k) = E_m(k)B_m(k)$$

$$B_m(k) = \left\lfloor \frac{|E_m(k)|^2 - \Lambda_m(k)}{|E_m(k)|^2} \right\rfloor_\varepsilon$$

$$\Lambda_m(k) = \mathcal{R}_m(k) + \mathcal{Q}_m(k) + \mathcal{P}_m(k),$$

wherein
$\lfloor \; \rfloor_\varepsilon$ denotes low clipping by $\varepsilon>0$,
$E_m(k)$ is the canceller output,
$R_m(k)$ is a power spectrum of the residual echo due to filter misalignment at the mth block,
$Q_m(k)$ is a power spectrum of the echo beyond the canceller's time scope at the mth block, and
$P_m(k)$ is a power spectrum of the non-linear echo components at the mth block.

10. The method according to claim 1, wherein the at least one filter coefficient $W_{i,j}(k)$ is updated based on $$W_{i,j}^{new}(k) = W_{i,j}(k) + \mu_{i,j,m}(k)\frac{E_m(k)X_{i,j,m}^*(k)}{|X_{i,j,m}(k)|^2 + \epsilon}.$$

11. The method according to claim 1, wherein the overshoot factor $\lambda$ equals 2.

12. The method according to claim 1, wherein at least one of the number of channels and the number of segments per channel is larger than one; and
the optimal step size $\mu_{i,j,m}(k)$ is determined from said canceller output $E_m(k)$ over the mth time block, from said canceller error $\varepsilon(k)$ over the m−$\ell$th time block, from said look-backward error $\overleftarrow{\varepsilon}(k)$, from said look-forward error $\overrightarrow{\varepsilon}(k)$ as well as from at least one additional look-backward error $\overleftarrow{\varepsilon}_{r,s}(k)$ and from at least one additional look-forward error $\overrightarrow{E}_{r,s}(k)$ for at least one r,sth filter, r and s being indices of the channel and the segment, respectively, wherein $$\overleftarrow{\varepsilon}_{r,s}(k) = \varepsilon(k) - \lambda\overleftarrow{\Delta}_{r,s}(k),$$

wherein $\overleftarrow{\Delta}_{r,s}(k)$ is based on $$\sum_{i}\sum_{j}^{i\neq r \& j\neq s} \frac{E_m(k)X_{i,j,m}^*(k)}{\sum_a\sum_b^{a\neq r \& b\neq s} |X_{a,b,m}(k)|^2 + \epsilon} X_{i,j,m-\ell}(k),$$

and $$\overrightarrow{\varepsilon}_{r,s}(k) = E_m(k) - \lambda\overrightarrow{\Delta}_{r,s}(k),$$

wherein $\overrightarrow{\Delta}_{r,s}(k)$ is based on $$\sum_{i}\sum_{j}^{i\neq r \& j\neq s} \frac{\mathcal{E}(k)X_{i,j,m-\ell}^*(k)}{\sum_a\sum_b^{a\neq r \& b\neq s} |X_{a,b,m-\ell}(k)|^2 + \epsilon} X_{i,j,m}(k).$$

13. An echo canceller having at least one channel and at least one segment per channel, the echo canceller having filter coefficients $W_{i,j}(k)$ being updateable in the frequency domain at a time block m, wherein the echo canceller is configured to:

determine a canceller output $E_m(k)$ over the mth time block as the difference between $Z_m(k)$ and a cancelling term based on $$\sum_{i=0}^{C-1}\sum_{j=0}^{S-1} W_{i,j}(k)X_{i,j,m}(k);$$

determine a canceller error $\varepsilon(k)$ over the m−$\ell$th time block as the difference between $Z_{m-\ell}(k)$ and a cancelling term based on $$\sum_{i=0}^{C-1}\sum_{j=0}^{S-1} W_{i,j}(k)X_{i,j,m-\ell}(k);$$

determine a look-backward error $\overleftarrow{\varepsilon}(k)$ as $$\overleftarrow{\varepsilon}(k)=\varepsilon(k)-\lambda\overleftarrow{\Delta}(k)$$

wherein $\overleftarrow{\Delta}(k)$ is based on $$\sum_{i=0}^{C-1}\sum_{j=0}^{S-1} \frac{E_m(k)X_{i,j,m}^*(k)}{\sum_{i=0}^{C-1}\sum_{j=0}^{S-1}|X_{a,b,m}(k)|^2+\epsilon} X_{i,j,m-\ell}(k);$$

determine a look-forward error $\overrightarrow{\varepsilon}(k)$ as $$\overrightarrow{\varepsilon}(k)=E_m(k)-\lambda\overrightarrow{\Delta}(k)$$

wherein $\overrightarrow{\Delta}(k)$ is based on $$\sum_{i=0}^{C-1}\sum_{j=0}^{S-1} \frac{\mathcal{E}(k)X_{i,j,m-\ell}^*(k)}{\sum_{a=0}^{C-1}\sum_{b=0}^{S-1}|X_{a,b,m-\ell}(k)|^2+\epsilon} X_{i,j,m}(k);$$

determine an optimal update step-size $\mu_{i,j,m}(k)$ from said canceller output $E_m(k)$ over the mth time block, from said canceller error $\varepsilon(k)$ over the m−$\ell$th time block, from said look-backward error $\overleftarrow{\varepsilon}(k)$, and from said look-forward error $\overrightarrow{\varepsilon}(k)$; and update said at least one filter coefficient $W_{i,j}(k)$ by using said optimal update step-size $\mu_{i,j,m}(k)$;

wherein

C corresponds to the number of channels i=0, . . . , C−1 of the echo canceller,

S corresponds to the number of segments j=0, . . . , S−1 per channel of the echo canceller, $\ell$ is an integer different than zero, k denotes a frequency bin, $\epsilon$ is a positive value, $Z_m(k)$ corresponds to the kth spectral bin of a microphone signal at the mth time block, $Z_{m-\ell}(k)$ corresponds to the kth spectral bin of the microphone signal at the m−$\ell$th time block, $X_{i,j,m}(k)$ corresponds to the kth spectral bin of a far-end signal at the ith channel, jth segment, and mth time block, $X_{i,j,m-\ell}(k)$ corresponds to the kth spectral bin of the far-end signal at the ith channel, jth segment, and m−$\ell$th time block, $\lambda$ is an overshoot factor, and a, b are channel and segment indices, respectively.

14. The echo canceller according to claim 13, wherein the echo canceller is further configured to compute the optimal step $\mu_{i,j,m}(k)$ size by either $$\mu_{i,j,m}(k) = \frac{\Phi_{i,j}(k)\mathcal{X}_{i,j,m}(k)}{\Psi_m(k)\sum_{a=0}^{C-1}\sum_{b=0}^{S-1}\Phi_{a,b}(k)\mathcal{X}_{a,b,m}(k)}$$

or $$\mu_{i,j,m}(k) = 1 - \sqrt{1 - \frac{\Phi_{i,j}(k)\mathcal{X}_{i,j,m}(k)}{\Psi_m(k)+\sum_{a=0}^{C-1}\sum_{b=0}^{S-1}\Phi_{a,b}(k)\mathcal{X}_{a,b,m}(k)}},$$

wherein $\Psi_m(k)$ is a power spectrum of the non-cancellable components at the mth time block and $\Phi_{i,j}(k)$ is a power spectrum of the misalignment of each i,jth filter, wherein the echo canceller is configured to determine $\Psi_m(k)$ and $\Phi_{i,j}(k)$ by solving the set of linear equations $$\Psi_m(k) = \sum_{i=0}^{C-1}\sum_{j=0}^{S-1}\mathcal{X}_{i,j,m}(k)\Phi_{i,j}(k) = |E_m(k)|^2$$

$$\Upsilon(k) + \sum_{i=0}^{C-1}\sum_{j=0}^{S-1}\mathcal{X}_{i,j,m-\ell}(k)\Phi_{i,j}(k) = |\mathcal{E}(k)|^2$$

$$\Upsilon(k) + 4\overleftarrow{T}(k)\Psi_m(k) + \sum_{i=0}^{C-1}\sum_{j=0}^{S-1}\mathcal{X}_{i,j,m-\ell}(k)\Phi_{i,j}(k) = |\overleftarrow{\mathcal{E}}(k)|^2$$

$$4\overrightarrow{T}(k)\Upsilon(k) + \Psi_m(k) + \sum_{i=0}^{C-1}\sum_{j=0}^{S-1}\mathcal{X}_{i,j,m}(k)\Phi_{i,j}(k) = |\overrightarrow{\mathcal{E}}(k)|^2$$

subject to inequality constraints $$\Upsilon(k)>0, \Psi_m(k)>0, \Phi_{0,0}(k)>0, \ldots, \Phi_{C-1,S-1}(k)>0;$$

wherein $\mathcal{X}_{i,j,m}(k)$ corresponds to the kth power spectral bin of the far-end signal at the ith channel, jth segment, and mth time block, $\mathcal{X}_{i,j,m-\ell}(k)$ corresponds to the kth power spectral bin of the far-end signal at the ith channel, jth segment, and m−$\ell$th time block, $\Upsilon(k)$ corresponds to the kth power spectral bin of a power spectrum of the non-cancellable components at the m−$\ell$th block, $\overleftarrow{T}(k)$ is the kth frequency bin of the normalized look-backward update, computed as $$\overleftarrow{T}(k)=\overleftarrow{\Delta}(k)/|E_m(k)|^2,$$

and $\overrightarrow{T}(k)$ is the kth frequency bin of the normalized look-forward update, computed as $$\overrightarrow{T}(k)=\overrightarrow{\Delta}(k)/|\varepsilon(k)|^2.$$

15. The echo canceller according to claim 13, wherein the overshoot factor $\lambda$ is in the range $1<\lambda\leq 2$.

16. The echo canceller according to claim 13, wherein the echo canceller is configured to determine an improved canceller output $O_m(k)$ as $$O_m(k) = E_m(k)B_m(k)$$

$$B_m(k) = \left\lfloor \frac{|E_m(k)|^2 - \Lambda_m(k)}{|E_m(k)|^2} \right\rfloor_\varepsilon$$

$$\Lambda_m(k) = \mathcal{R}_m(k) + \mathcal{Q}_m(k) + \mathcal{P}_m(k),$$

wherein $\lfloor \ \rfloor_\varepsilon$ denotes low clipping by $\varepsilon > 0$, $E_m(k)$ is the canceller output, $R_m(k)$ is a power spectrum of the residual echo due to filter misalignment at the mth block, $Q_m(k)$ is a power spectrum of the echo beyond the canceller's time scope at the mth block, and $P_m(k)$ is a power spectrum of the non-linear echo components at the mth block.

17. The echo canceller according to claim 13, wherein the echo canceller is configured to update the at least one filter coefficient $W_{i,j}(k)$ based on $$W_{i,j}^{new}(k) = W_{i,j}(k) + \mu_{i,j,m}(k)\frac{E_m(k)X_{i,j,m}^*(k)}{|X_{i,j,m}(k)|^2 + \epsilon}.$$

18. The echo canceller according to claim 13, wherein the overshoot factor $\lambda$ equals 2.

19. The echo canceller according to claim 14, wherein the overshoot factor $\lambda$ is in the range $1 < \lambda \leq 2$.

20. The echo canceller according to claim 14, wherein the overshoot factor $\lambda$ equals 2.

* * * * *

UNITED STATES PATENT AND TRADEMARK OFFICE
CERTIFICATE OF CORRECTION

Page 1 of 3

PATENT NO. : 10,880,440 B2
APPLICATION NO. : 16/646352
DATED : December 29, 2020
INVENTOR(S) : Luis Weruaga It is certified that error appears in the above-identified patent and that said Letters Patent is hereby corrected as shown below:

On the Title Page

Item (73):
Now reads: PROCTIV AUDIO GMBH
Should read: -- PROACTIVAUDIO GMBH --

In the Specification

Column 6, Line 12, formula (13):
Now reads: $i\ Y=O+\hat{V}\circ(1-B_{NLP})$,
Should read: -- $Y=O+\hat{V}\circ(1-B_{NLP})$, --

Column 7, Line 19, formula (19):

Now reads:
$$\sum_{i=0}^{C-1}\sum_{j=0}^{S-1}\frac{\mathcal{E}(k)X^{*}_{i,j,m-\ell}(k)}{\sum_{a=0}^{C-1}\sum_{b=0}^{S-1}|X_{i,j,m-\ell}(k)|^{2}+\epsilon}X_{i,j,m-\ell}(k);$$

Should read:
$$\sum_{i=0}^{C-1}\sum_{j=0}^{S-1}\frac{\mathcal{E}(k)X^{*}_{i,j,m-\ell}(k)}{\sum_{a=0}^{C-1}\sum_{b=0}^{S-1}|X_{a,b,m-\ell}(k)|^{2}+\epsilon}X_{i,j,m}(k);$$
--

Column 10, Line 23, in formulas (33) and (34):

(33) Now reads:
$$Y(k)+4\overleftarrow{T_{r,s}}(k)\Psi_{m}(k)+$$
$$4\overleftarrow{T_{r,s}}(k)X_{r,s,m}(k)\Phi_{r,s}(k)++\sum_{i=0}^{C-1}\sum_{j=0}^{S-1}X_{i,k,m-1}(k)\Phi_{i,j}(k)=|\overleftarrow{\varepsilon_{r,s}}(k)|^{2}$$

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,880,440 B2

(34) Now reads:
$$\Psi_m(k) + 4\overrightarrow{T_{r,s}}(k)Y(k) + 4\overrightarrow{T_{r,s}}(k)X_{r,s,m-1}(k)\Phi_{r,s}(k) + +\sum_{i=0}^{C-1}\sum_{j=0}^{S-1} X_{i,k,m-1}(k)\Phi_{i,j}(k) = |\overrightarrow{\varepsilon_{r,s}}(k)|^2$$

(33) Should read: --
$$Y(k) + 4\overleftarrow{T_{r,s}}(k)\Psi_m(k) + 4\overleftarrow{T_{r,s}}(k)X_{r,s,m}(k)\Phi_{r,s}(k) + \sum_{i=0}^{C-1}\sum_{j=0}^{S-1} X_{i,k,m-1}(k)\Phi_{i,j}(k) = |\overleftarrow{\varepsilon_{r,s}}(k)|^2$$
--

(34) Should read: --
$$\Psi_m(k) + 4\overrightarrow{T_{r,s}}(k)Y(k) + 4\overrightarrow{T_{r,s}}(k)X_{r,s,m-1}(k)\Phi_{r,s}(k) + \sum_{i=0}^{C-1}\sum_{j=0}^{S-1} X_{i,k,m-1}(k)\Phi_{i,j}(k) = |\overrightarrow{\varepsilon_{r,s}}(k)|^2$$
--

Column 10, Line 41, in formula (36):

Now reads: $\overleftarrow{T_{r,s}}(k) = \overleftarrow{\Delta_{r,s}}(k)/|E_m(k)/|^{21}$, Should read: -- $\overleftarrow{T_{r,s}}(k) = \overleftarrow{\Delta_{r,s}}(k)/|E_m(k)|^2$, --

Column 15, Line 17, in formula (56):
Now reads: $\mu_{i,j,m} = 1 - 1 - E\{|R_{i,j,m}|^2\}/E\{|E_m|^2\}$.

Should read: -- $\mu_{i,j,m} = 1 - \sqrt{1 - E\{|R_{i,j,m}|^2\}/E\{|E_m|^2\}}$. --

Column 23, Line 61, in formula (110):

Now reads: $\Omega_m(k) = \lfloor \mathcal{N}\{\Gamma_m(k)\} - \mathcal{L}\{\mathcal{N}_m(k)\}\rfloor_{\delta(k)}$ Should read: -- $\Omega_m(k) = \lfloor \mathcal{N}\{\Gamma_m(k)\} - \mathcal{N}\{\mathcal{L}_m(k)\}\rfloor_{\delta(k)}$ --

In the Claims

In Claim 4, Column 26, Line 60 to Column 27, Line 1:

Now reads:
$$Y(k) + 4\overleftarrow{T_{r,s}}(k)\Psi_m(k) + 4\overleftarrow{T_{r,s}}(k)X_{r,s,m}(k)\Phi_{r,s}(k) + +\sum_{i=0}^{C-1}\sum_{j=0}^{S-1} X_{i,j,m-1}(k)\Phi_{i,j}(k) = |\overleftarrow{\varepsilon_{r,s}}(k)|^2$$

$$\Psi_m(k) + 4\overrightarrow{T_{r,s}}(k)Y(k) + 4\overrightarrow{T_{r,s}}(k)X_{r,s,m-1}(k)\Phi_{r,s}(k) + +\sum_{i=0}^{C-1}\sum_{j=0}^{S-1} X_{i,j,m}(k)\Phi_{i,j}(k) = |\overrightarrow{\varepsilon_{r,s}}(k)|^2$$

CERTIFICATE OF CORRECTION (continued)
U.S. Pat. No. 10,880,440 B2

$$\Upsilon(k) + 4\overleftarrow{T_{r,s}}(k)\Psi_m(k) + 4\overleftarrow{T_{r,s}}(k)X_{r,s,m}(k)\Phi_{r,s}(k) + \sum_{i=0}^{C-1}\sum_{j=0}^{S-1} X_{i,j,m-1}(k)\Phi_{i,j}(k) =$$

$$\left|\overleftarrow{\mathcal{E}_{r,s}}(k)\right|^2$$

$$\Psi_m(k) + 4\overrightarrow{T_{r,s}}(k)\Upsilon(k) + 4\overrightarrow{T_{r,s}}(k)X_{r,s,m-1}(k)\Phi_{r,s}(k) + \sum_{i=0}^{C-1}\sum_{j=0}^{S-1} X_{i,j,m}(k)\Phi_{i,j}(k) =$$

Should read: --
$$\left|\overrightarrow{\mathcal{E}_{r,s}}(k)\right|^2$$ --